US012598511B2

(12) United States Patent
Frankkila et al.

(10) Patent No.: US 12,598,511 B2
(45) Date of Patent: Apr. 7, 2026

(54) SEGMENTATION FOR COORDINATION AMONG MULTIPLE NODES IN DUAL CONNECTIVITY

(71) Applicant: Telefonaktiebolaget LM Ericsson (publ), Stockholm (SE)

(72) Inventors: Tomas Frankkila, Luleå (SE); Malik Wahaj Arshad, Stockholm (SE); Christofer Lindheimer, Vadstena (SE); Stefan Wager, Espoo (FI); Mattias Bergström, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 556 days.

(21) Appl. No.: 17/923,477

(22) PCT Filed: May 5, 2021

(86) PCT No.: PCT/SE2021/050418
§ 371 (c)(1),
(2) Date: Nov. 4, 2022

(87) PCT Pub. No.: WO2021/225504
PCT Pub. Date: Nov. 11, 2021

(65) Prior Publication Data
US 2023/0189069 A1     Jun. 15, 2023

Related U.S. Application Data

(60) Provisional application No. 63/021,757, filed on May 8, 2020.

(51) Int. Cl.
*H04W 28/06*          (2009.01)
(52) U.S. Cl.
CPC ............................... *H04W 28/065* (2013.01)

(58) Field of Classification Search
None
See application file for complete search history.

(56) References Cited

U.S. PATENT DOCUMENTS 10,869,360 B2   12/2020  Lee et al.
11,671,973 B2    6/2023  Rudolf et al.
(Continued)

FOREIGN PATENT DOCUMENTS

CN       104812088 A     7/2015
CN       104919735 A     9/2015
(Continued)

OTHER PUBLICATIONS

Huawei, 3GPP TSG-RAN2 Meeting#105bis R2-1904814 (Year: 2019).*
(Continued)

*Primary Examiner* — Jay L Vogel
(74) *Attorney, Agent, or Firm* — Sage Patent Group

(57)          ABSTRACT

A method performed by a first node. The method is for handling a message to a third node. The message comprises content from at least a first second node of one or more second nodes. The first node handles a radio communication with the third node in coordination with the one or more second nodes. The first node sends the message to the third node, segmented or not segmented. Whether the message is sent segmented or not segmented is based on: i) whether or not a size of the message exceeds a size limit, ii) whether or not the third node supports segmentation of messages, iii) whether or not the first node supports segmentation of messages, and iv) whether or not at least the first second node of the one or more second nodes supports segmentation of messages.

26 Claims, 16 Drawing Sheets

(56)          References Cited

U.S. PATENT DOCUMENTS

| | | | |
|---|---|---|---|
| 2007/0153742 A1 | 7/2007 | Sebire et al. | |
| 2015/0319801 A1 | 11/2015 | Lee et al. | |
| 2016/0142939 A1 | 5/2016 | Yi et al. | |
| 2016/0308776 A1 | 10/2016 | Ozturk et al. | |
| 2019/0149997 A1 | 5/2019 | Liao et al. | |
| 2022/0217583 A1* | 7/2022 | Jin | H04W 8/24 |
| 2023/0180337 A1* | 6/2023 | Jin | H04W 8/22 |
| | | | 370/329 |

FOREIGN PATENT DOCUMENTS

| | | |
|---|---|---|
| CN | 109804657 A | 5/2019 |
| CN | 110383880 A | 10/2019 |
| WO | 2015008966 A1 | 1/2015 |
| WO | 2019031948 A1 | 2/2019 |
| WO | 2020063444 A1 | 4/2020 |

OTHER PUBLICATIONS

Chinese First Office Action for Chinese Patent Application No. 202180033553.5, dated Sep. 18, 2024, 42 pages (with English translation).

Zhang, Cuiyue, "Research on multi/dual connectivity technology in 5G network," Chinese Master's Thesis, Beijing Jiaotong University, Jun. 2017, 83 pages (English abstract included).

International Search Report and Written Opinion of the International Searching Authority for PCT International Application No. PCT/SE2021/050418 dated Jul. 9, 2021.

Samsung, "Discussion on RRC segmentation," R3-210208, 3GPP TSG-RAN WG3 Meeting #111e, Jan. 25-Feb. 4, 2021, Online, 6 pages.

Ericsson, "RRC Segmentation for UE Capabilities," R2-1903999, 3GPP TSG-RAN WG2 #105bis, Xi'an, China, Apr. 8-12, 2019, 3 pages.

Ericsson et al., "Introduction of RRC Segmentation—Downlink," R2-1915763, 3GPP TSG-RAN2 Meeting #108, Reno, NV, USA, Nov. 18-22, 2019, 8 pages.

ETSI MCC, "Report of 3GPP TSG RAN WG2 meeting #108 Reno, USA Nov. 18-22, 2019," R2-2000009, 3GPP TSG-RAN WG2 meeting #109-e, 323 pages.

3GPP TR 37.873 V16.0.0, "3rd Generation Partnership Project; Technical Specification Group Radio Access Network; NR and Evolved Universal Terrestrial Radio Access (E-UTRA); Study on optimizations of UE radio capability signalling; (Release 16)," Mar. 2019, 16 pages.

3GPP TS 36.323 V16.0.0, "3rd Generation Partnership Project; Technical Specification Group Radio Access Network; Evolved Universal Terrestrial Radio Access (E-UTRA); Packet Data Convergence Protocol (PDCP) specification (Release 16)," Mar. 2020, 56 pages.

3GPP TS 37.340 V16.1.0, "3rd Generation Partnership Project; Technical Specification Group Radio Access Network; Evolved Universal Terrestrial Radio Access (E-UTRA) and NR; Multi-connectivity; Stage 2 (Release 16)," Mar. 2020, 74 pages.

3GPP TS 38.323 V16.0.0, "3rd Generation Partnership Project; Technical Specification Group Radio Access Network; NR; Packet Data Convergence Protocol (PDCP) specification (Release 16)," Mar. 2020, 37 pages.

Chinese Office Action, Chinese Patent Application No. 202180033553.5, mailed May 15, 2025, 29 pages.

* cited by examiner

Figure 11:
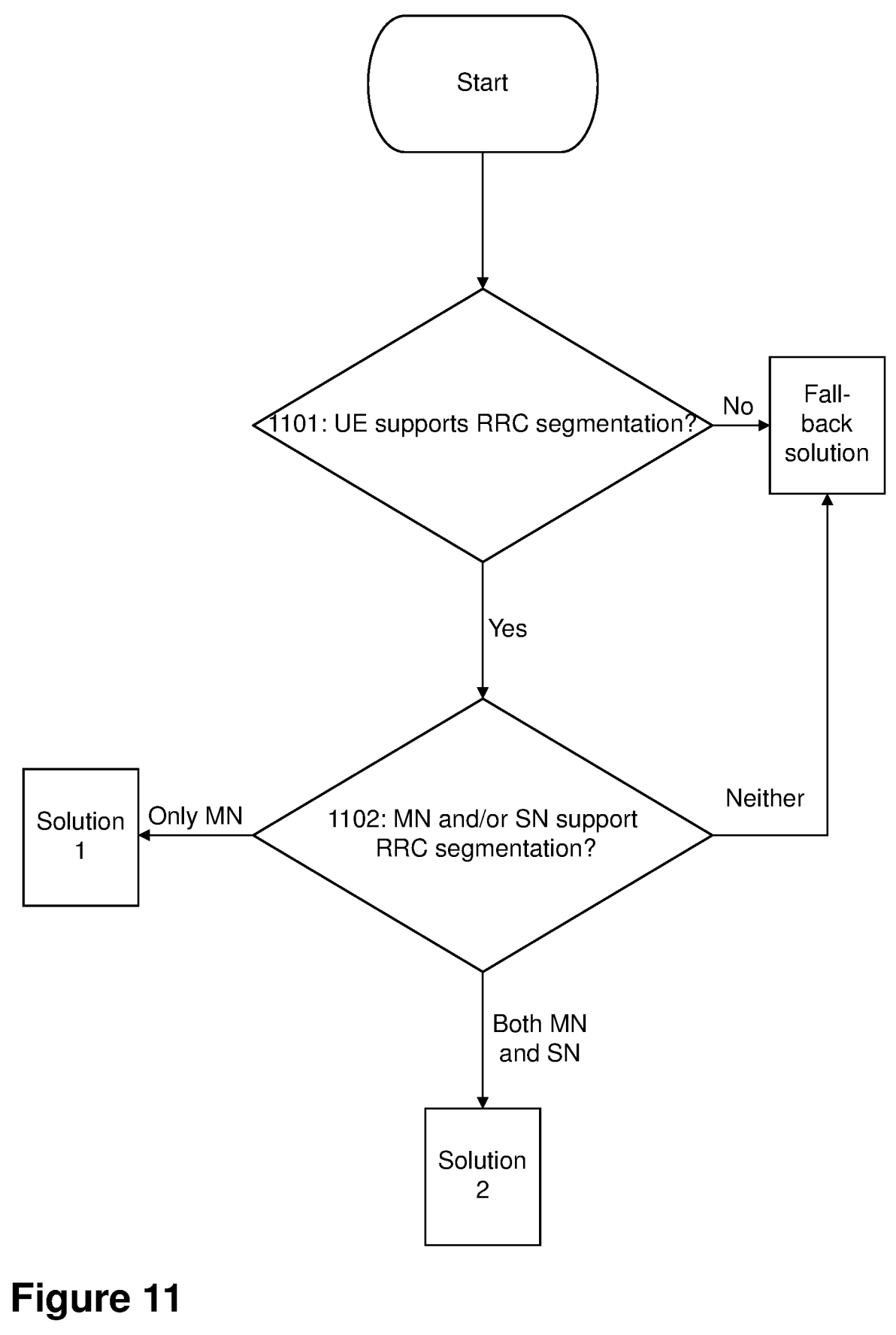

Start

1101: UE supports RRC segmentation? — No → Fall-back solution

Yes

1102: MN and/or SN support RRC segmentation?

Only MN → Solution 1

Neither → Fall-back solution

Both MN and SN → Solution 2

BEGIN

2110
Base station receives user data from UE

2120
Base station initiates transmission of user data to the host computer

2130
Host computer receives the user data

END

SEGMENTATION FOR COORDINATION AMONG MULTIPLE NODES IN DUAL CONNECTIVITY

CROSS REFERENCE TO RELATED APPLICATIONS

This application is a 35 U.S.C. § 371 national stage application of PCT International Application No. PCT/SE2021/050418 filed on May 5, 2021, which claims the benefit of U.S. Provisional Patent Application Ser. No. 63/021,757, filed on May 8, 2020, the disclosures and content of which are incorporated by reference herein in their entireties.

TECHNICAL FIELD

The present disclosure relates generally to a first node and methods performed thereby for handling a message to a third node. The present disclosure also relates generally to a second node, and methods performed thereby for handling the message to the third node. The present disclosure also relates generally to computer programs and computer-readable storage mediums, having stored thereon the computer programs to carry out these methods.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points. The expression Uplink (UL) may be used for the transmission path in the opposite direction i.e., from the wireless device to the base station. The standardization organization 3GPP is currently in the process of specifying the New Radio Interface called NR or 5G-UTRA, as well as a Fifth Generation (5G) Packet Core Network, which may be referred to as Next Generation (NG) Core Network, abbreviated as NG-CN, NGC or 5G CN.

RRC Segmentation

Segmentation of Radio Resource Control (RRC) messages is being introduced for 3GPP Release 16. This may be needed to support transmitting large RRC messages that may exceed the Packet Data Convergence Protocol (PDCP) Serving Data Unit (SDU) size limit, which may be 9000 bytes for NR and 8188 bytes for LTE [3GPP TS 37.873, version 16.0.0]. Other (R)ANs may have other limits.

It is expected that, for example, RRC messages sent in UL and containing UE Radio Capability signalling may exceed the above described limits. It is also expected that RRC messages sent in DL and containing UE configuration may also exceed the above limits.

Dual Connectivity

FIG. 1 is a schematic diagram depicting the multiple architecture options for Multi-Radio Dual Connectivity (MR-DC) described in 3GPP Release 15 [2]. Currently, 3GPP Release 15 supports up to 7 architecture options which may include both stand-alone and non-stand-alone scenarios. Only Option 1, Option 2, Option 3, Option 4, Option 5 and Option 7 are depicted in the schematic diagram of FIG. 1. Option 1 corresponds to standalone LTE connected to EPC, Option 2 corresponds to Standalone NR connected to 5GCN, or NR-NR DC, Option 3 corresponds to LTE-NR Dual Connectivity (DC) connected to EPC (EN-DC), Option 4 corresponds to NR—E-UTRA Dual Connectivity (NE-DC), Option 5 corresponds to LTE connected to 5GCN (eLTE or LTE-5GC)), and Option 7 corresponds to E-UTRA—NR Dual Connectivity (NGEN-DC). In principle, NR and LTE may be deployed without any interworking, denoted by NR stand-alone (SA) operation, that is, an eNB may be connected to an EPC and a gNB in NR may be connected to a 5G core network (5GC), with no interconnection between the two, as depicted, respectively, in Option 1 and Option 2 in the figure. On the other hand, the first supported version of NR is the so-called Evolved Universal Terrestrial Radio Access Network (E-UTRAN)-NR Dual Connectivity (EN-DC), illustrated by Option 3. In such a deployment, dual connectivity between NR and LTE may be applied with LTE as master and NR as secondary node. The RAN node (gNB) supporting NR, may not have a control plane connection to the EPC core network, instead it may rely on the LTE as master node (MeNB). This is also referred to as "Non-standalone NR". It may be noted that in this case, the functionality of an NR cell may be limited and may be used for connected mode UEs as a booster and/or as a diversity leg, but an RRC_IDLE UE cannot camp on these NR cells. With introduction of 5GC, other options may be also valid. As mentioned above, Option 2 supports a stand-alone NR deployment where a gNB may be connected to a 5GC. Similarly, LTE may also be connected to a 5GC using Option 5, also known as eLTE, E-UTRA/5GC, or LTE/5GC, and the node may be referred to as an ng-eNB. In these cases, both NR and LTE may be seen as part of the NG-RAN, and both the ng-eNB and the gNB may be referred to as NG-RAN nodes.

In this document, a special focus may be placed on the architecture options supporting dual connectivity, specifi-cally: Option 3, which is EN-DC, Option 4, which is NE-DC, and Option 7, which is NGEN-DC. Option 4 and option 7 are other variants of dual connectivity between LTE and NR which will be standardized as part of NG-RAN connected to 5GC, denoted by Multi-Radio Dual Connec-tivity (MR-DC).

As migration for these options may differ from different operators, it is possible to have deployments with multiple options in parallel in the same network, e.g., there may be an eNB base station supporting option 3, 5 and 7 in the same network, as an NR base station supporting 2 and 4. FIG. 1 depicts at the bottom, different UEs supporting different types of deployments. The UE in the far left supports LTE/EPC, the UE in the middle further supports NR/EPC, and the UE in the far right additionally supports LTE/4GC and NR/5GC.

As part of MR-DC configuration, each UE may be con-figured with two separately scheduled cell groups namely: a Master Cell Group (MCG) and a Secondary Cell Group (SCG).

The Master Cell Group (MCG) may be understood to belong to a Master Node (MN) and the Secondary Cell Group may be understood to belong to a Secondary Node (SN). Based on the MR-DC type, MN and SN may either be LTE cells or NR cells.

Bearer Termination Options in MR-DC for the UE

An important aspect to understand in MR-DC is the bearer termination. FIG. 2 is a schematic diagram depicting the bearer types as arrows, based on termination points in the UE for MR-DC. In this figure, the MN uses NR and the SN uses LTE. Other dual connectivity variants may exist where MN and SN may use different combinations of NR and LTE. A corresponding variant is possible when dual connectivity may be used with 5G Core Network (5GC). There may be mainly three types of bearer termination in MR-DC, namely: a) MN terminated bearer or Master Cell Group (MCG) bearer 1: in MR-DC, a radio bearer for which PDCP may be located in the MN, b) SN terminated bearer or Secondary Cell Group (SCG) bearer 2: in MR-DC, a radio bearer for which PDCP may be located in the SN, and c) Split bearer 3: a radio bearer with Radio Link Control (RLC) in both MN and SN. FIG. 2 depicts how each of the MCG bearer 1 and SCG bearer 2 has a respective Packet Data Convergence Protocol (PDCP) entity 4, NR PDCP for the MCG 1 and the split bearer 3, and LTE/NR PDCP for the SCG 2, and a Radio Link Controller (RLC) entity 5, each connected to a respective Medium Access Control (MAC) 6 entity. The split bearer 3 has a PDCP entity in the MN and is connected to each of the MAC entities 6 for the MCG bearer 1 and the SCG bearer 2, via, respectively, a respective RLC entity.

Dual connectivity with two RANs, e.g. E-UTRAN and NR, may be achieved in several ways. For example, 3GPP TS 37.340 [2] describes the following variants.

A first variant may be Multi-Radio Dual Connectivity (MR-DC), which may be understood as a generalization of Intra-E-UTRA dual connectivity, where a UE may be con-nected to two different nodes, e.g., base stations, one using NR access and the other using either E-UTRA or NR access. One node may act as Master Node (MN) and the other node may act as Secondary Node (SN). At least the MN may be connected to the core network (CN).

A second variant may be MR-DC with EPC (EN-DC), which may be understood as MR-DC where the CN may be Evolved Packet Core (EPC) and where an eNB may act as MN and an en-gNB may act as SN. The MN may be connected to EPC via the S1 interface. The SN may also be connected to the EPC via the S1-U interface. The MN and the SN may be connected via the X2 interface.

A third variant may be E-UTRA—NR Dual Connectivity (NGEN-DC), according to which a UE may be connected to one ng-eNB and one gNB, where the ng-eNB may be acting as MN and the gNB may be acting as a SN. The ng-eNB may be connected to 5GC. The MN may be connected to 5GC. The MN and the SN may be connected via the X2 interface.

A fourth variant may be NR—E-UTRA Dual Connectiv-ity (NE-DC), according to which a UE may be connected to one gNB, acting as a MN, and also a ng-eNB acting as a SN. The MN may be connected to 5GC. The MN and SN may be connected via the X2 interface.

A fifth variant may be NR—NR Dual Connectivity (NR-DC), according to which a UE may be connected to two gNBs, one acting as MN and the other acting as SN. The MN may be connected to 5GC. The SN may also be connected to 5GC via the NG-U interface.

The above described variants may apply to the user plane signalling. The control plane signalling may be sent in MCG using Signaling Radio Bearers (SRB) 1 (SRB1), SRB2.

More details are described in 3GPP TS 37.340, [2].

Dual Connectivity in RAN

FIG. 3 is a schematic diagram depicting the network side radio protocol termination options for MCG, SCG and split bearers in the MN 7 and SN 8 for MR-DC with EPC (EN-DC), according to existing methods, see 3GPP TS 37.340, version 16.1.0, FIG. 4.2.2-3. When MR-DC with EPC is used, the SN may be configured via the X2 9 interface from the MN 7. When the SN 8 creates the DL configuration message, e.g., Cell Group (CG)-config or CG-configinfo, it may be sent to the MN 7 via the X2 interface 9 and then from the MN 7 to the UE. FIG. 3 depicts how each of the MCG bearer 10, the SCG bearer 11 and the split bearer 12 have a respective Packet Data Convergence Protocol (PDCP) entity 13 and Radio Link Controller (RLC) entity 14, each connected to a respective Medium Access Control (MAC) 15 entity in each of the MN and SN. The split bearer 16 has a PDCP entity in the MN 11, and is connected to each of the MAC entities 19 in the MN 11 and the SN 12, via, respectively, an RLC entity located in each of the MN 11 and the SN 12. In accordance with the EN-DC variant, the MN 7 uses E-UTRA, and the SN 8 uses NR.

FIG. 4 is a schematic diagram depicting the network side radio protocol termination options for MCG, SCG and split bearers in the MN 16 and SN 17 for MR-DC with 5GC (NGEN-DC, NE-DC and NR-DC), according to 3GPP TS 37.340, version 16.1.0, FIG. 4.2.2-4. When MR-DC with 5GC is used, the SN 17 may be configured via the Xn interface 18 from the MN 16. When the SN 17 creates the DL configuration message, e.g., CG-config or CG-config-info, it may be sent to the MN 16 via the X2 interface 18 and then from the MN 16 to the UE. As may be seen in FIG. 4, DRBs may be terminated in either the MN 16 or the SN 17, and be transmitted via either the master cell group, via an MCG bearer 19, the secondary cell group, via an SCG bearer 20, or both, via a split bearer 21. Any combination of MN and SN terminated bearers as well as MCG, SCG and split bearers may be configured for a UE. The schematic diagram of FIG. 4 further depicts how Quality of Service (QoS) flows 22 arriving at the SDAP layer 23 at each of the MN 16 and the SN 17, and how the each of the MCG bearer 19, SCG bearer 20 and Split bearer 21 cross each of the NR PDCP layer 24, RLC layer 25 and MAC layer 26 at each of the MN 16 and the SN 17, interconnecting between themselves over the Xn interface 18.

MR-DC Control Plane Architecture

FIG. 5 is a schematic representation depicting control plane architecture for EN-DC (left) and MR-DC with 5GC (right), where MeNB 27 denotes an eNB that acts as MN, and SgNB 28 denotes an en-gNB that acts as SN. The MeNB 27 may be connected to EPC via an S1 interface 29. The MeNB 27 and the SgNB 28 may be connected via the X2-C interface 30. A UE 31 in MR-DC may have a single control plane connection to the core network and a single RRC state 32, controlled by the MN. Both MN and SN may have an own RRC entity 32 for creating RRC messages or Information Elements (IE) for configuring the UE 31, see FIG. 5. Since the SN may be responsible for its own resources, it may provide the UE 31 with the Secondary Cell Group (SCG) configuration in an RRC message, and also the radio bearer configuration in an IE, for all bearers that may be terminated in the SN. The MN in turn may create the Master Cell Group (MCG) configuration and the radio bearer configuration for all bearers terminated in the MN. The cell group configuration may include the configuration of L1 (physical layer), Medium Access Control (MAC) and RLC. The radio bearer configuration may include the configuration of PDCP, and Service Data Protocol (SDAP) in case of 5GC. Also depicted in FIG. 5 is the Uu interface 33 between the UE 31 and each of the MN and the SN. The panel on the right in FIG. 5 illustrates the same connections for an MR-DC with 5GC variant, wherein the MN 34 has a connection to the NGC via an NG-C interface 35. FIG. 6, according to existing methods.

LTE-New Radio (NR) DC, also referred to as LTE-NR tight interworking, EN-DC in case the UE is connected to EPC or NGEN-DC, in case the UE is connected to 5GC, has been standardized in 3GPP rel-15. The major changes from LTE DC may be understood to be: a) the introduction of a split bearer from the SN, known as SCG split bearer, b) the introduction of a split bearer for RRC, split SRB1 36, split SRB2 37, and c) the introduction of a direct RRC from the SN, also referred to as SCG SRB or SRB3 38. FIG. 6 is a schematic representation depicting network side protocol termination options for SRBs in MR-DC, illustrating the different SRB types. SRB1 39 and SRB2 40, refer to the signalling radio bearers that may be used for carrying RRC messages. RRC configurations created by the SN may be sent to the UE either via the MN using SRB1 or directly to the UE using SRB3, if configured. For the SRB1 case, the MN may receive from the SN an RRC message containing the SCG configuration and an IE containing the radio bearer configuration. The MN may encapsulate these into the RRC message it may create itself, that may also include changes to the MCG configuration and radio bearer configuration of bearers terminated in the MN. Thereby, the MCG and SCG configurations may be sent in the same RRC message, which may be understood to mean that it may be the aggregate size for the MCG and SCG configurations, plus RRC message encapsulation overhead, that may be limited by the PDCP size limit. Alternatively, the MCG and SCG configurations may also be sent in different RRC messages, which may be understood to mean that the PDCP size limit may apply individually to the RRC messages carrying the MCG and SCG configurations, respectively. Depicted in FIG. 6 is how each of the SRB1 39, SRB2 40, Split SRB1 36, Split SBR2 37 and SBR38 go through each of the PDCP, PLC and MAC layers for each of the MCG and SCG, for the DC options, as indicated.

Current Solution for Sending DL Configuration Message to UE

As described above, when configuring dual connectivity, the SN may send an RRC message and IE containing the SCG configuration and the radio bearer configuration to the MN, using the internode RRC message CG-config on X2/Xn. The MN may therefore have two RRC configuration messages to send to the UE, one for MCG and another for SCG. In addition, there may also be the IE containing the radio bearer configuration created by the SN, that may need to be included in the RRC message created by the MN.

If the size of the resulting RRC message created by the MN is sufficiently small, that is, the PDCP size limitation is not exceeded, then the MN may encapsulate everything in the same RRC message. However, if the resulting RRC message would exceed the PDCP size limit, then MN may also send the MN and SN generated configurations in different RRC messages. Then, the MN may in a first RRC reconfiguration procedure make the required changes in the MCG configuration and then in a second RRC reconfiguration procedure make the changes in the SCG configuration and SN terminated radio bearers. This legacy solution may be called the "fall-back" approach later in this description.

The MN may not need to understand the SCG configuration provided by the SN since the SCG configuration may be included transparently in the RRC message created by the MN.

UE Support for RRC Segmentation

In the current solution for RRC segmentation in DL [4], it is defined that the UE may declare in the UE capabilities whether RRC segmentation is supported or not. The MN may use this information to know if segmentation may or may not be used for RRC messages in DL and, if not supported, also for limiting the size of the DL configuration messages. The receiver buffer of the UE may also put limitations on the DL segmentation. In current 3GPP specifications it is defined that the UE may need to have a receiver buffer of at least 45 Kbyte. The current solution for RRC segmentation therefore limits DL segmentation to max 5 segments.

WO 2020/063444 describes a data transmission method comprising employing an RRC segmentation function of an RRC layer entity or an RRC segmentation function of a new protocol layer entity of a sending communication device to generate multiple RRC segments. Each of the multiple RRC segments carries a portion of data content in an RRC message generated by the sending communication device. The method also comprises sending the multiple RRC segments to a receiving communication device.

SUMMARY

As part of the development of embodiments herein, one or more challenges with the existing technology will first be identified and discussed.

The current solution in 3GPP describes the PDCP size limits for each respective (R)AN, that is, the size may be limited to 9000 bytes when using NR PDCP [3GPP TS 38.323, version 16.0.0] and to 8188 bytes when using LTE PDCP [3GPP TS 36.323, version 16.0.0], which is also described in TR 37.873, version 16.0.0, [3].

The current solution in 3GPP describes how to segment RRC messages into multiple segments if the PDCP limit is exceeded [1]. However, the segmentation is specified independently for NR and LTE. Dual connectivity is not yet handled.

There are therefore currently no methods for how to handle RRC segmentation in dual connectivity scenarios, including multi-RAT dual connectivity scenarios, e.g., if MN is NR and SN is LTE.

There are not methods defining whether it is the MN or the SN that may need to perform the segmentation.

There are no methods defining the interaction between MN and SN, for example: Does the MN know if the SN supports segmentation or not? Does the MN need to know this? If needed, how does the MN get this information? Does MN configure the SN? How? Which protocols and interfaces are used for this configuration? Or does the MN receive some kind of capability information from the SN, e.g., when dual connectivity is configured? How? Which protocols and interfaces are used? Does the SN know if the MN supports segmentation or not? Does SN need to know this? If needed, how does the SN get this information? If the MN does not support segmentation, should the SN then also be prevented from using segmentation, if supported,? And vice versa?

There are not methods defining the requirements to support segmentation in the MN, the SN or the UE on the overall downlink segmentation solution. If one of the involved nodes does not support segmentation, how would the other node know that and how would they react to creating and handling of RRC messages?

There are no methods defining the requirements on the UE, in terms of segmentation, for the dual connectivity case. The UE may indicate whether it supports segmentation or not in the capability information that may be sent to the network. There may be different information elements for LTE and NR. Hence, the UE may report segmentation capability independently for LTE and NR. However, it is not clear whether the UE may need to support segmentation for both RATs if it supports segmentation for one of them. If the UE is allowed to have different support for segmentation for LTE and NR, then how the MN and the SN may need to handle this is not defined.

Another scenario where there are no methods defined for how to handle segmentation is in handover scenarios where the same issues as described for Dual Connectivity may apply, but instead between the node which the UE may handover from, referred to as the source node, and the node which the UE may handover to, referred to as the target node.

It is an object of embodiments herein to improve the handling of messages in a wireless communications network. Particularly, it may be understood to be an object of embodiments herein to improve the handling of segmentation of the messages in a wireless communications network. Further particularly, it may be understood to be an object of embodiments herein to improve the segmentation for coordination among multiple nodes, e.g., in dual connectivity.

According to a first aspect of embodiments herein, the object is achieved by a method, performed by a first node. The method is for handling a message to a third node. The message comprises content from at least a first second node of one or more second nodes. The first node handles a radio communication with the third node in coordination with the one or more second nodes. The first node operates in a wireless communications network. The first node sends the message to the third node. The message is one of segmented and not segmented. Whether the message is sent segmented or not segmented is based on: i) whether or not a size of the message exceeds a size limit, ii) whether or not the third node supports segmentation of messages, iii) whether or not the first node supports segmentation of messages, and iv) whether or not at least the first second node of the one or more second nodes supports segmentation of messages.

According to a second aspect of embodiments herein, the object is achieved by a method, performed by a first second node. The method is for handling the message to the third node. The message comprises content from at least the first second node of one or more second nodes. The first second node handles the radio communication with the third node in coordination with at least the first node. The first second node operates in the wireless communications network. The first second node determines whether or not to segment the message based on: i) whether or not the size of the message exceeds a size limit, ii) whether or not the third node supports segmentation of messages, iii) whether or not the first node supports segmentation of messages, and iv) whether or not at least the first second node of the one or more second nodes supports segmentation of messages. The first second node initiates processing the message based on a fourth result of the determination.

According to a fourth aspect of embodiments herein, the object is achieved by the first node, for handling the message to the third node. The message is configured to comprise the content from at least the first second node of the one or more second nodes. The first node is configured to handle the radio communication with the third node in coordination with the one or more second nodes. The first node is configured to operate in the wireless communications network. The first node is further configured to send the message to the third node. The message is configured to be one of segmented and not segmented. Whether the message is sent segmented or not segmented is configured to be based on: i) whether or not the size of the message exceeds a size limit, ii) whether or not the third node supports segmentation of messages, iii) whether or not the first node supports segmentation of messages, and iv) whether or not at least the first second node of the one or more second nodes is configured to support segmentation of messages.

According to a fifth aspect of embodiments herein, the object is achieved by the first second node, for handling the message to the third node. The message is configured to comprise content from at least the first second node of one or more second nodes. The first second node is configured to handle the radio communication with the third node in coordination with at least a first node. The second node is configured to operate in the wireless communications network. The first second node is further configured to determine whether or not to segment the message based on: i) whether or not the size of the message exceeds the size limit, ii) whether or not the third node supports segmentation of messages, iii) whether or not the first node supports segmentation of messages, and iv) whether or not at least the first second node of the one or more second nodes supports segmentation of messages. The first second node is also configured to initiate processing the message based on the fourth result of the determination.

By sending the message to the third node, segmented and not segmented based on: i) whether or not the size of the message exceeds the size limit, ii) whether or not the third node supports segmentation of messages, iii) whether or not the first node supports segmentation of messages, and iv) whether or not at least the first second node of the one or more second nodes supports segmentation of messages, the first node may be enabled to decide to segment the message only when this may be supported by the involved nodes, and only when necessary, due to the size of the message exceeding the size limit. The first node 111 may thereby enable to ensure that a consistent segmentation approach may be applied in dual connectivity scenarios and handover scenarios. This may be performed while optimizing the use of resources in the wireless communications network.

BRIEF DESCRIPTION OF THE DRAWINGS

Examples of embodiments herein are described in more detail with reference to the accompanying drawings, and according to the following description.

FIG. 11 is a signalling diagram illustrating another non-limiting example of methods in a wireless communications network, according to embodiments herein.

10

Figures 18, 19:
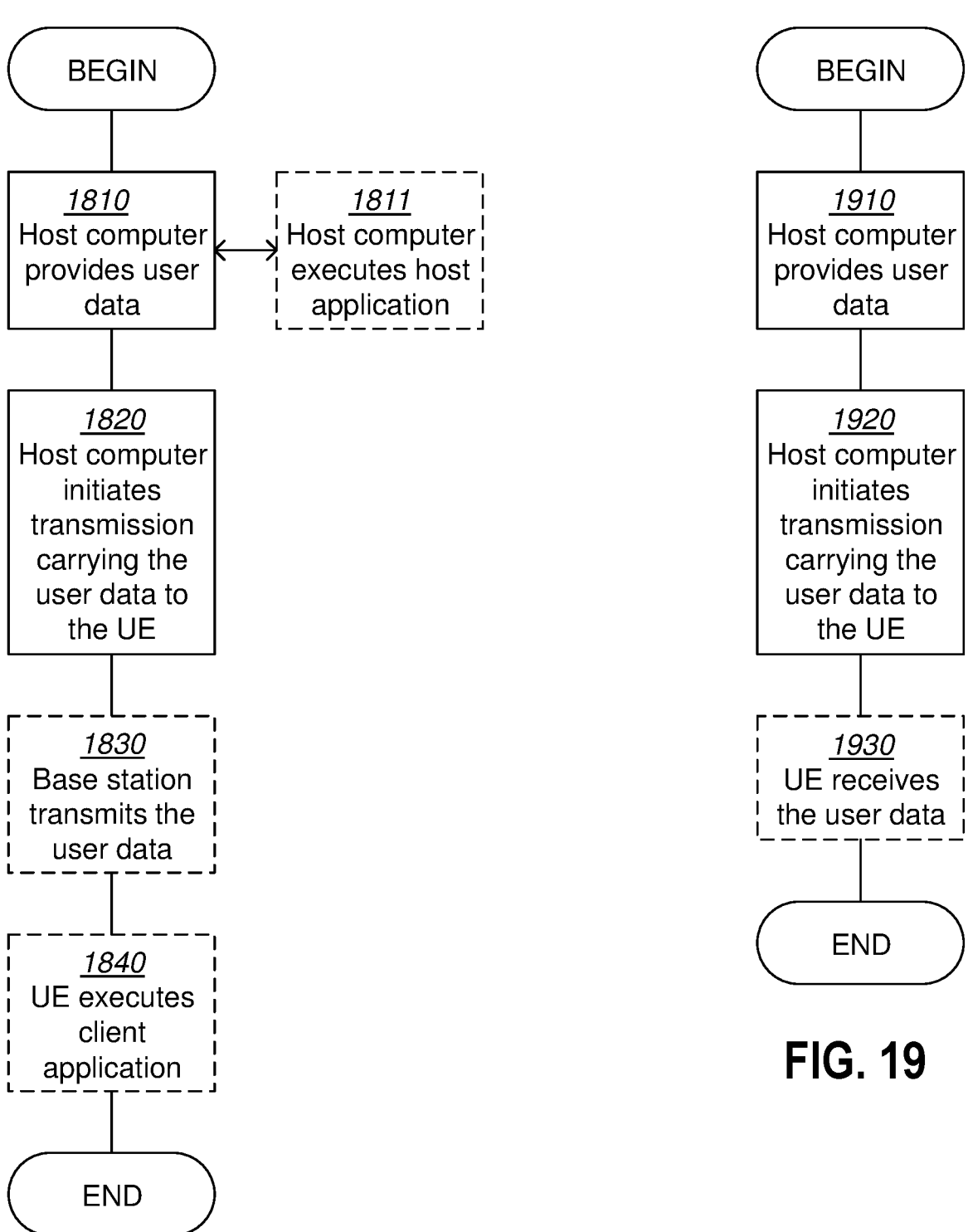

FIG. 18 is a flowchart depicting embodiments of a method in a communications system including a host computer, a base station and a user equipment, according to embodiments herein.

FIG. 19 is a flowchart depicting embodiments of a method in a communications system including a host computer, a base station and a user equipment, according to embodiments herein.

Figures 20, 21:
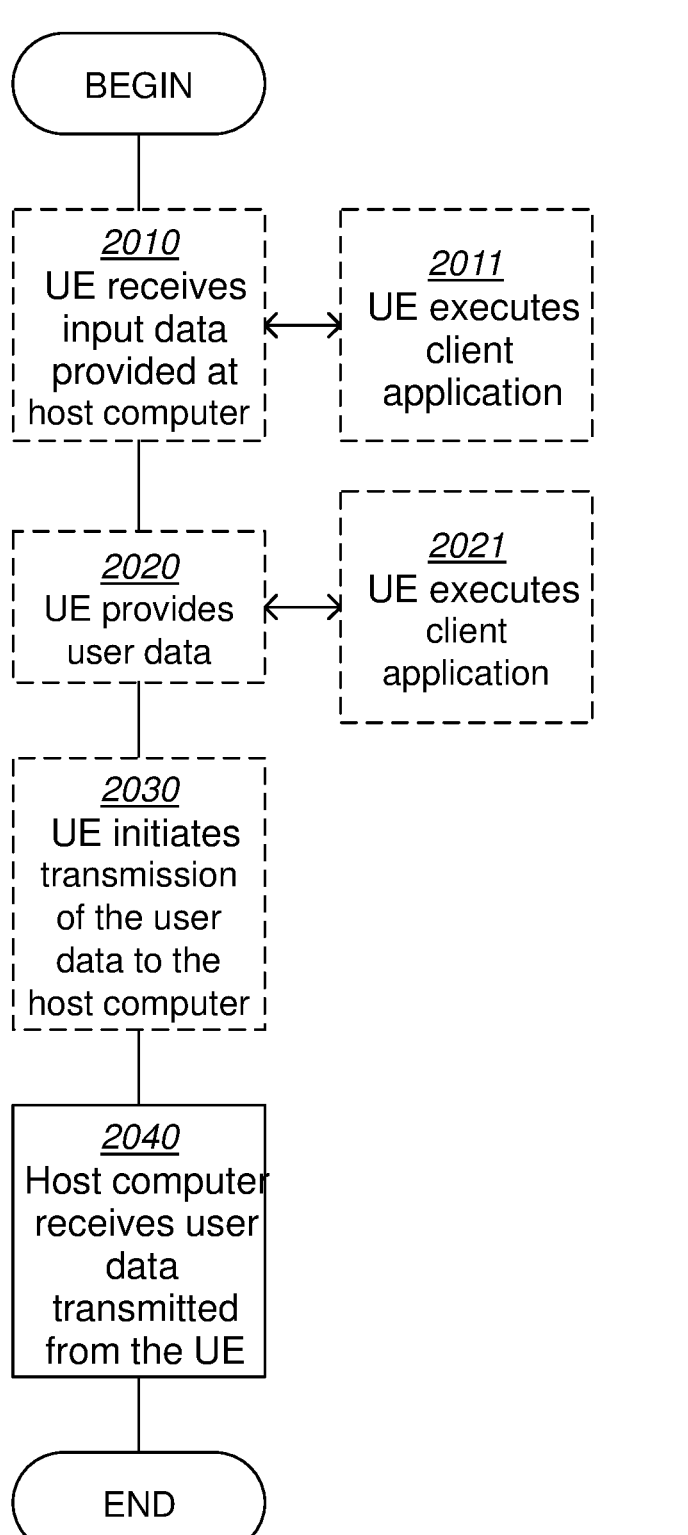

FIG. 20 is a flowchart depicting embodiments of a method in a communications system including a host computer, a base station and a user equipment, according to embodiments herein.

FIG. 21 is a flowchart depicting embodiments of a method in a communications system including a host computer, a base station and a user equipment, according to embodiments herein.

DETAILED DESCRIPTION

Certain aspects of the present disclosure and their embodiments may provide solutions to the challenge discussed in the Summary section, or other challenges. There are, proposed herein, various embodiments which address one or more of the issues disclosed herein.

Embodiments herein may be understood to be related to methods for segmentation for coordination among multiple nodes. Embodiments herein may be understood to be related to methods for segmentation for dual connectivity, particularly, methods for RRC segmentation for dual connectivity.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figures 1, 2:
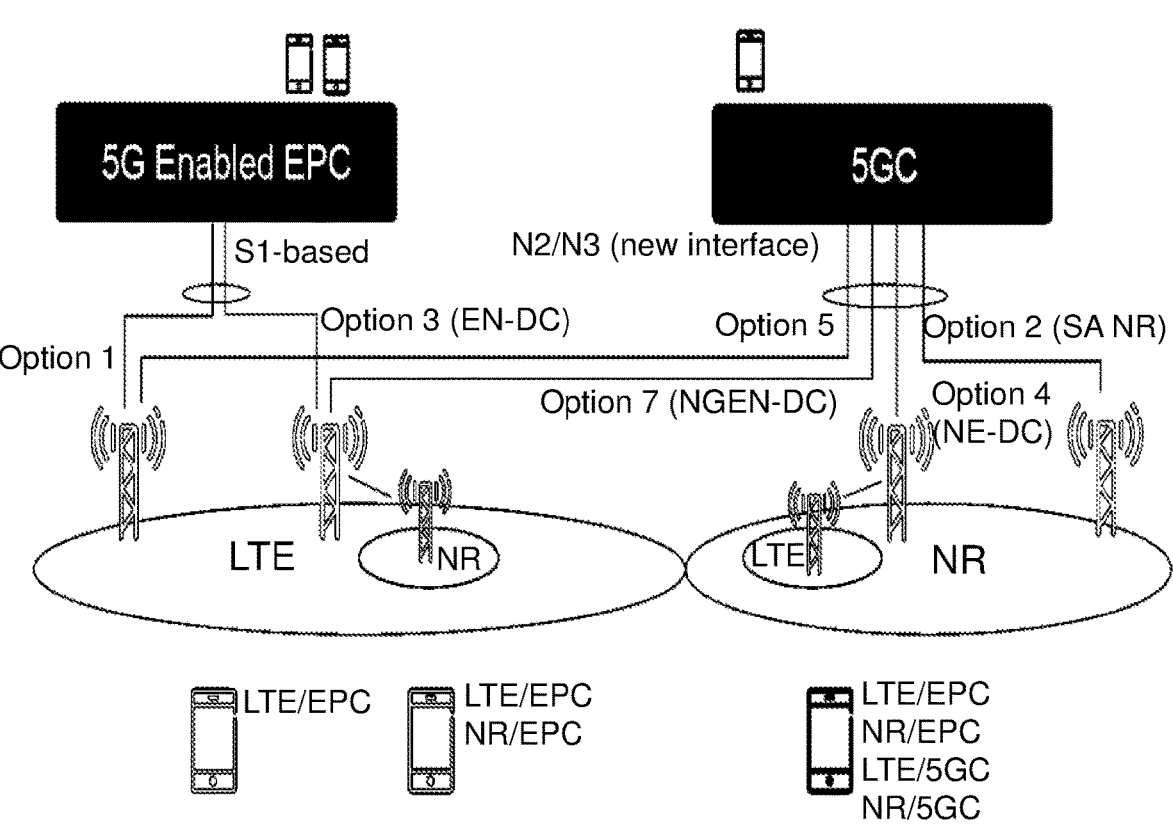
FIG. 1 is a schematic representation depicting architecture options in 3GPP Release 15, according to existing methods.
FIG. 2 is a schematic representation depicting bearer termination in MR-DC, according to existing methods.
Figure 3:
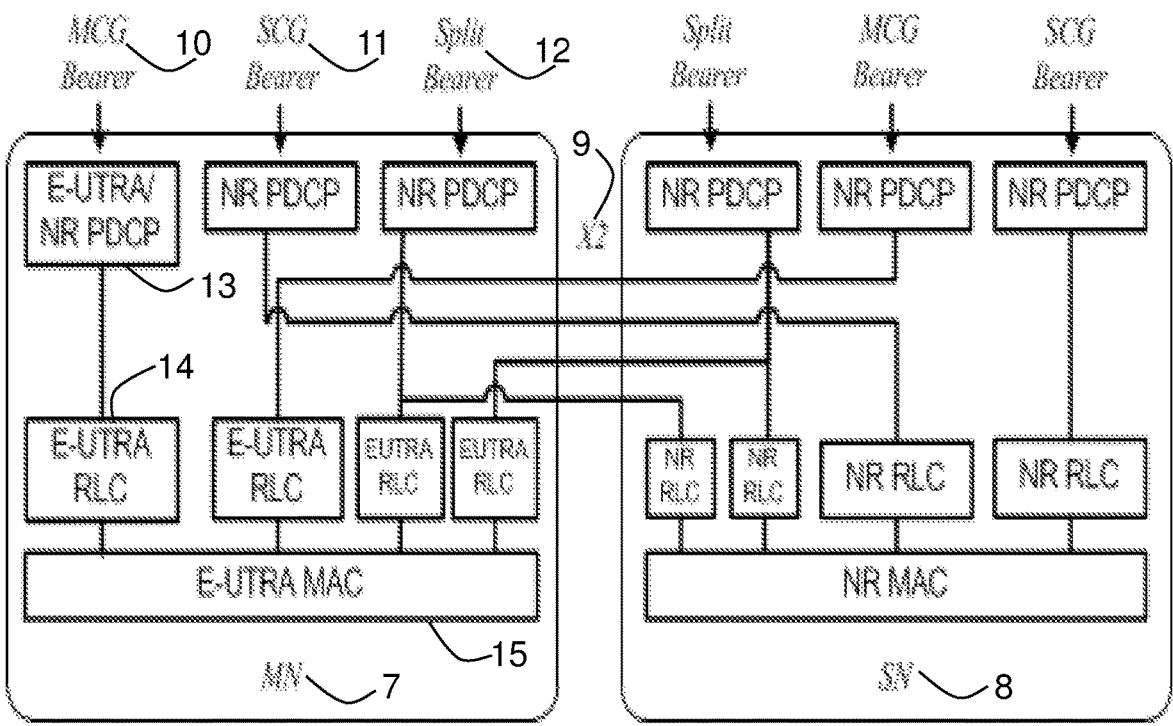
FIG. 3 is a schematic representation depicting network side protocol termination options according to existing methods.
Figure 4:
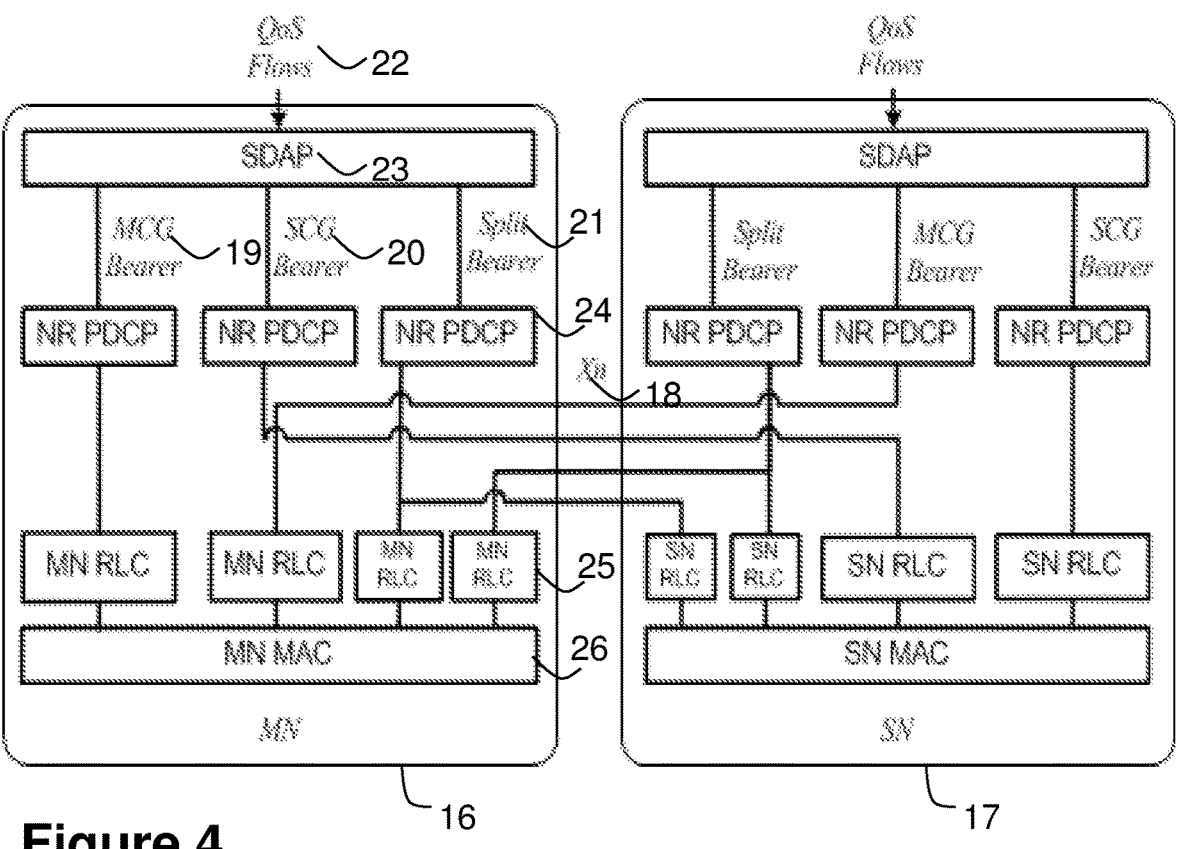
FIG. 4 is a schematic representation depicting other network side protocol termination options, according to existing methods.
Figure 5:
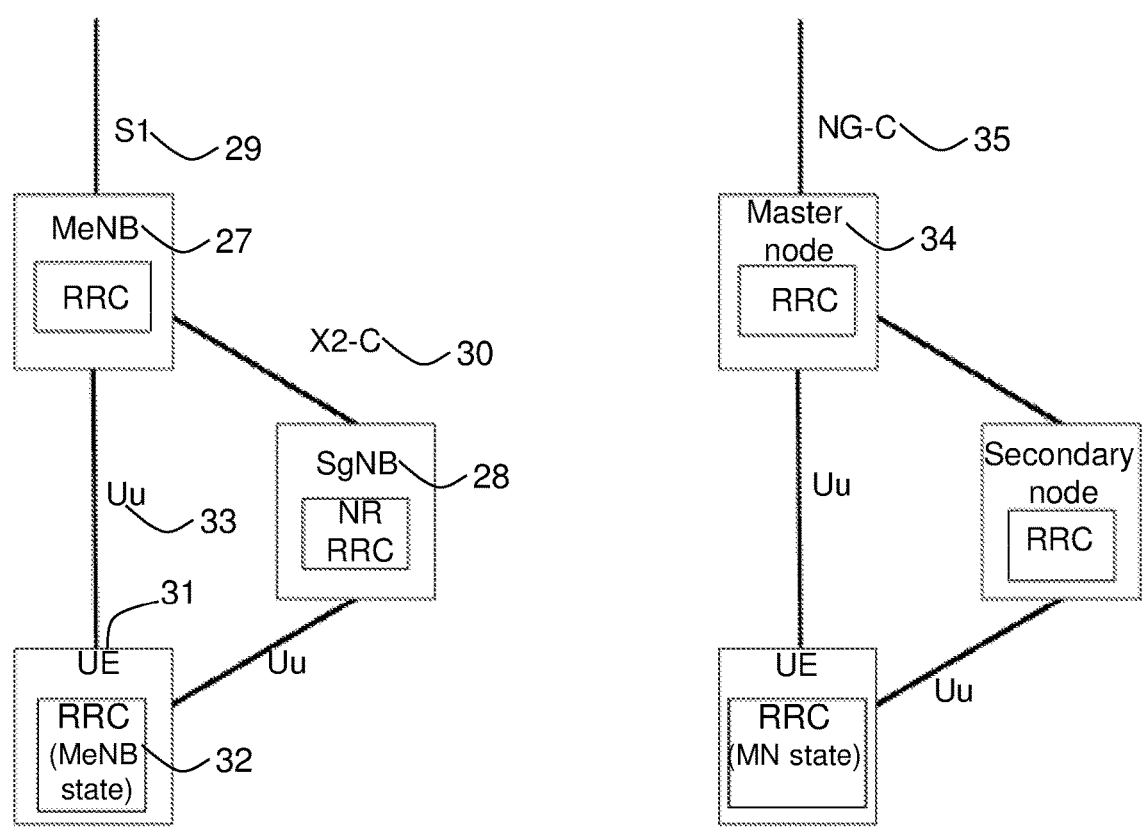
FIG. 5 is a schematic representation depicting control plane architecture for EN-DC (left) and MR-DC with 5GC (right), according to existing methods.
Figure 6:
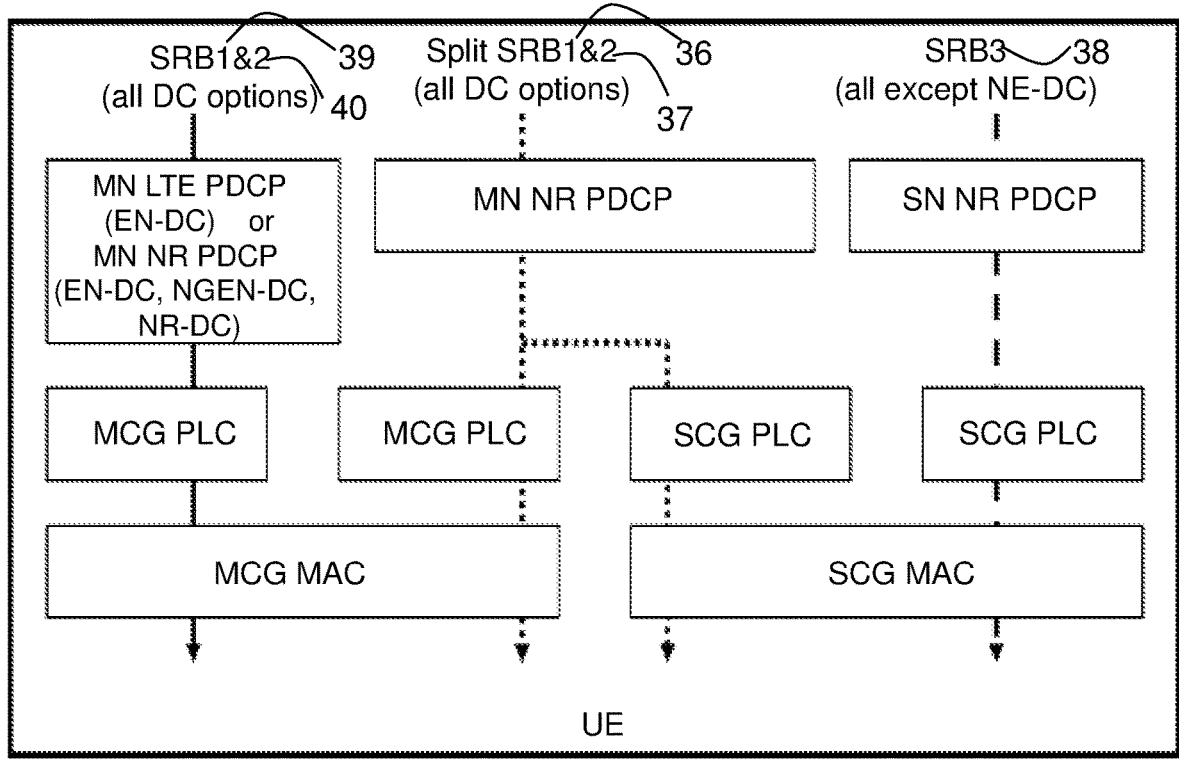
FIG. 6 is a schematic representation depicting network side protocol termination options for SRBs in MR-DC, according to existing methods.
Figure 7:
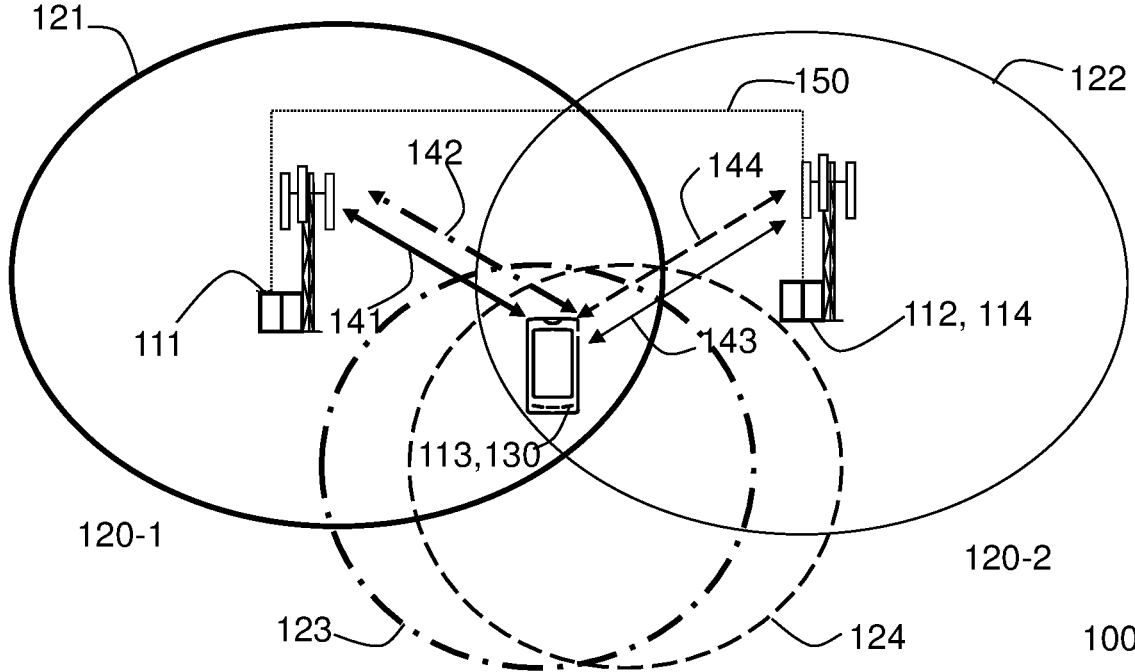
FIG. 7 is a schematic diagram illustrating a wireless communications network, according to embodiments herein.

FIG. 7 depicts a non-limiting example of a wireless communications network 100, sometimes also referred to as a wireless communications system, cellular radio system, or cellular network, in which embodiments herein may be implemented. The wireless communications network 100 may be a 5G system, 5G network, NR-U or Next Gen System or network, LAA, MulteFire. The wireless communications network 100 may support a younger system than a 5G system. The wireless communications network 100 may support other technologies, such as, for example Long-Term Evolution (LTE), LTE-Advanced/LTE-Advanced Pro, e.g., LTE Frequency Division Duplex (FDD), LTE Time Division Duplex (TDD), LTE Half-Duplex Frequency Division Duplex (HD-FDD), LTE operating in an unlicensed band, etc. . . . . In particular examples of embodiments herein, the wireless communications network 100 may support MR- DC. Other examples of other technologies the wireless communications network 100 may support may be Wideband Code Division Multiple Access (WCDMA), Universal Terrestrial Radio Access (UTRA) TDD, Global System for Mobile communications (GSM) network, GSM/Enhanced Data Rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), Internet of Things (IoT), NarrowBand IoT, NB-IoT, or any cellular network or system. Thus, although terminology from 5G/NR and LTE may be used in this disclosure to exemplify embodiments herein, this should not be seen as limiting the scope of the embodiments herein to only the aforementioned systems.

The wireless communications network 100 may comprise a plurality of nodes, whereof a first node 111, a one or more second nodes 112 and a third node 113 are depicted in the non-limiting example of FIG. 7. The one or more second nodes 112 comprise a first second node 114. In some embodiments, such as that depicted in the non-limiting example of FIG. 7, the one or more second nodes 112 only comprise the first second node 114. In other examples, the one or more second nodes 112 comprise the first second node 114 and additional nodes. This is not depicted in FIG. 7 to simplify the figure.

Any of the first node 111, the one or more second nodes 112 and the third node 113 may be a radio network node. That is, a transmission point such as a radio base station, for example a gNB, an eNB, or any other network node with similar features capable of serving a wireless device, such as a user equipment or a machine type communication device, in the wireless communications network 100. In other examples, which are not depicted in FIG. 7, any of the first node 111 and the one or more second nodes 112 may be a distributed node, such as a virtual node in the cloud, and may perform its functions entirely on the cloud, or partially, in collaboration with a radio network node. The first node 111 and at least one of the one or more second nodes 112 may, in some examples, be co-located or be the same network node. In typical examples, such as those depicted in FIG. 7, the first node 111, one or more second nodes 112, particularly, the first second node 114, and the third node 113 may be different nodes.

In further typical examples, the first node 111 may be a first network node, any of the first one or more second nodes 112 may be a second network node, and the third node 113 may be a wireless device. A description of the wireless device is provided later.

In further particular examples, the first node 111 may be a first radio network node, any of the one or more second nodes 112 may be a second radio network node, and the third node 113 may be a wireless device. A description of the wireless device is provided later.

The wireless communications network 100 covers a geographical area which may be divided into cell areas, wherein each cell area may be served by a network node, although, one radio network node may serve one or several cells. The wireless communications network 100 comprises at least a first cell 121, and one or more second cells 122. The first node 111 may serve the first cell 121, and the one or more second nodes 112 may respectively serve one of the one or more second cells 122.

In some examples, the wireless communications network 100 may comprise one of: a first group of cells 120-1 and one or more second groups of cells 120-2. The first group of cells 120-1 may comprise the first cell 121, and one or more third cells 123. In the non-limiting examples depicted in FIG. 7, only one of the one or more third cells 123 is depicted to simplify the Figure. However, it will be understood that more other cells may be comprised in the one or more third cells 123. In some non-limiting examples, the first group of cells 120-1 may Master Cell Group (MCG).

The one or more second groups of cells 120-2 may comprise the one or more second cells 122, and one or more fourth cells 124. In the non-limiting examples depicted in FIG. 7, only one fourth cell 124 is depicted to simplify the Figure. However, it will be understood that more fourth cells may be comprised in the one or more fourth cells 124. In some non-limiting examples, any or all of the one or more second groups of cells 120-2 may be a Secondary Cell Group (SCG).

In some examples, e.g., in a multiconnectivity or dual-connectivity scenario, the first node 111 may be a MN and the one or more second nodes 112, e.g., the first second node 114, may be a SN.

In other examples, e.g., in a multiconnectivity or dual-connectivity scenario, the first node 111 may be a SN, the first second node 114 may be an MN and the other second nodes of the one or more second nodes 112 may be SNs.

In other examples, such as in a handover scenario, the first node 111 may be a source node and the first second node 114 may be a target node.

In other examples such as in a handover scenario, the first node 111 may be a target node and the first second node 114 may be a source node.

In yet other examples, e.g., for a central unit (CU)-distributed unit (DU) split architecture where a network node may be split between a CU and one or more distributed units (DU), the first node 111 may be a DU and the first second node 114 may be a CU. The other second nodes of the one or more second nodes 112, if any, may be other DUs.

In other examples, e.g., for a CU-DU split architecture, the first node 111 may be a first DU and the first second node 114 may be a CU or a second DU. The other second nodes of the one or more second nodes 112, if any, may be other DUs.

Any of the first node 111 and the one or more second nodes 112 may be of different classes, such as, e.g., macro base station, home base station or pico base station, based on transmission power and thereby also cell size. Any of the first node 111 and the first second node 114 may support one or several communication technologies, and its name may depend on the technology and terminology used. In 5G/NR, any of the first node 111 and the first second node 114 may be referred to as a gNB and may be directly connected to one or more core networks, which are not depicted in FIG. 7.

A plurality of wireless devices may be comprised in the wireless communication network 100, whereof a wireless device 130, is depicted in the non-limiting example of FIG. 7. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The third node 113 may be configured to communicate within the wireless communications network 100 with the first node 111 in the first cell 121 over a first link 141, e.g., a radio link. The third node 113 may be configured to communicate within the wireless communications network 100 with the first node 111 in each of the one or more third cells 123 over a respective second link 142, e.g., a radio link. The third node 113 may be configured to communicate within the wireless communications network 100 with each of the one or more second nodes 112 in the second cell 122 over a respective third link 143, e.g., a radio link. The third node 113 may be configured to communicate within the wireless communications network 100 with the one or more second nodes 112 in any of the one or more fourth cells 124 over a respective fourth link 144, e.g., a radio link.

The first node 111 and any of the one or more second nodes 112 may be configured to communicate within the wireless communications network 100 over a respective fifth link 150, e.g., a wired link or an X2 or Xn interface.

In general, the usage of "first", "second", "third", "fourth", "fifth", "sixth" and/or "seventh" herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first node, such as the first node 111, e.g., a gNB or a eNB, and embodiments related to a second node, such as the first second node 114, e.g., another gNB or another eNB.

Embodiments of a method, performed by the first node 111, will now be described with reference to the flowchart depicted in FIG. 8. The method may be understood to be for handling a message to the third node 113. The message comprises content from at least the first second node 114 of the one or more second nodes 112. The first node 111 handles a radio communication with the third node 113 in coordination with the one or more second nodes 112. For example the coordination of the radio communication may be based on multiconnectivity, e.g., dual connectivity, based on a handover, or based on a split architecture. The multiple connectivity, e.g., dual connectivity, may be Multi Radio (MR) multiconnectivity or multiple connectivity.

The first node 111 operates in the wireless communications network 100.

The method may be understood to be a computer-implemented method.

The Nodes

In some embodiments, at least one of the following options may apply. In a first option, the first node 111 may serve the third node 113 with multiple connectivity with the one or more second nodes 112.

In embodiments wherein the coordination may comprise dual connectivity, examples of embodiments herein may be understood to include processing both for the dual connectivity setup phase and for the run-time phase.

In a second option, the first node 111 may be to handover a connection, e.g., the radio communication, with the third node 113 to or from the first second node 114.

In a third option, the first node 111 may be a Master Node (MN) for the third node 113 and the one or more second nodes 114 may be Secondary Nodes (SNs) for the third node 113 in the multiple connectivity.

In a fourth option, the first second node 114 may be an MN for the third node 113 and the first node 111 and the other one or more second nodes 121 may be SNs, for the third node 113 in the multiple connectivity.

In a fifth option, the first node 111 may be a source node for the third node 113 and the first second node 114 may be a target node for the third node 113, e.g., in a handover scenario.

In a sixth option, the first node 111 may be a target node for the third node 113 and the first second node 114 may be a source node for the third node 113, e.g., in a handover scenario.

In a seventh option, the first node 111 may be a Distributed Unit (DU) and the first second node 114 may be a Centralized Unit (CU), e.g., in a split architecture scenario.

In an eighth option, the first node 111 may be a CU and each of the one or more second nodes 112 may be a DU, e.g., in a split architecture scenario.

In a ninth option, the first node 111 may be a first DU and any of the one or more second nodes 112 may be another DU, e.g., in a split architecture scenario.

In some embodiments, at least one of the first node 111 and the first second node 114 may be an MN and the other may be an SN. In some of these embodiments, only the MN and the third node 113 may support segmentation. In some other of these embodiments, both the MN, the SN and the third node 113 may support segmentation.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first node 111 is depicted FIG. 8. Some actions may be performed in a different order than that shown in FIG. 8.

Figure 8:
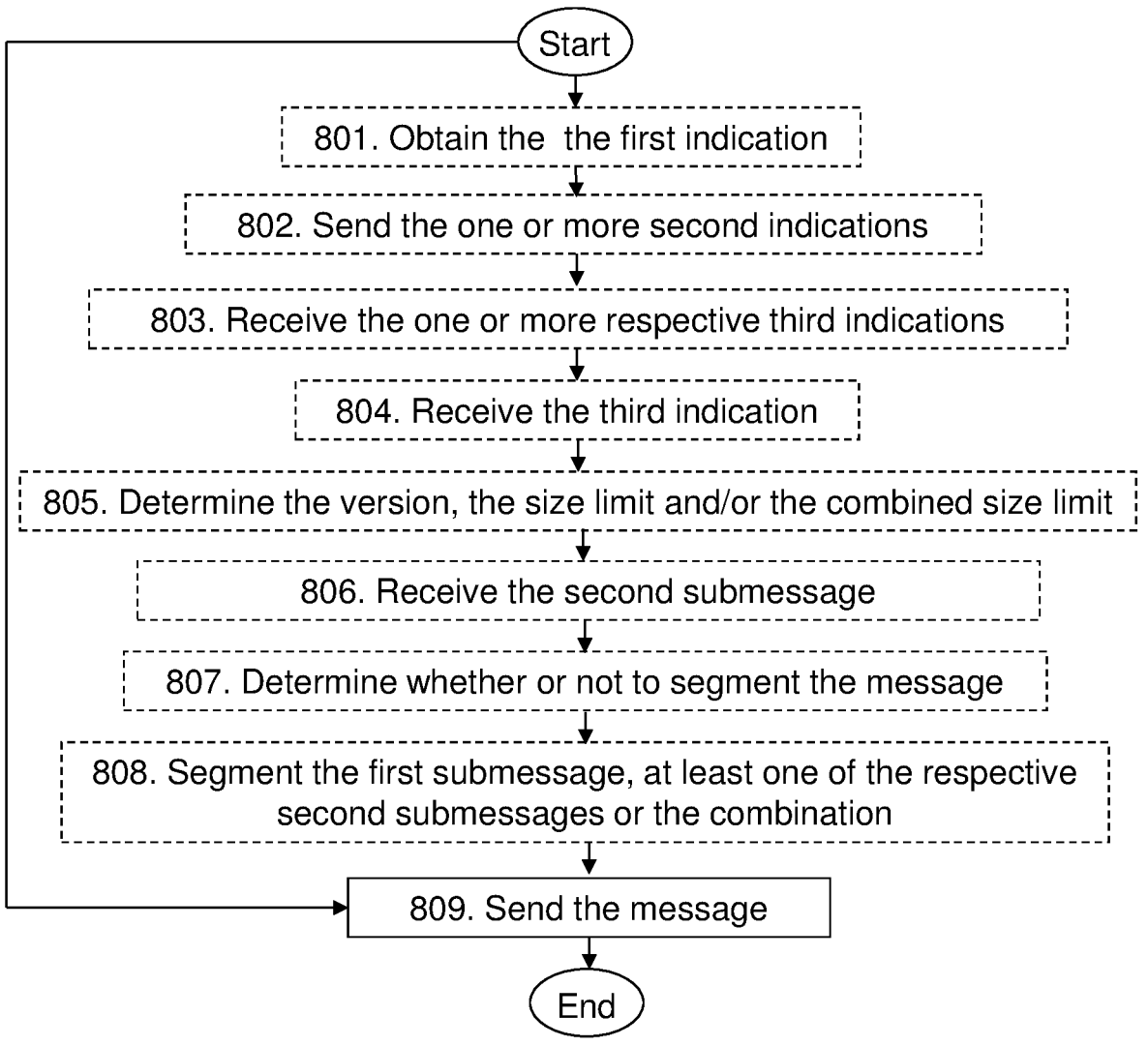
FIG. 8 is a flowchart depicting an example of a method in a first node, according to embodiments herein.

In FIG. 8, optional actions are represented with dashed boxes.

Action 801

During the course of communications in the wireless communications network 100, the first node 111 may send messages to the third node 113, which, since the first node 111 handles the radio communication with the third node 113 in coordination with the one or more second nodes 112, may comprise content from at least the first second node 114. The message may, as a consequence, be large and exceed a size limit, such as a PDCP limit for LTE and NR. Embodiments herein may be understood to define behavior of the first node 111, e.g., MN and the first second node 114, e.g., SN to handle such a message, e.g., an RRC message, that may exceed a size limit, e.g., PDCP limit for LTE and NR. In order to handle the message exceeding the size limit, the first node 111 may need to segment the message. Accordingly, embodiments herein may be understood to provide methods to handle segmentation, such as segmentation of RRC messages, in the radio communication by the first node 111 with the third node 113 in coordination with the one or more second nodes 112, e.g., such as in dual connectivity scenarios, and may be understood to define the behavior of the first node 111 and the first second node 114 in this regard.

In order to determine if the message may need to be segmented, the first node 111 may first need to determine if the third node 113 may be able to handle the segmented message. According to the foregoing, in this Action 801, the first node 111 may obtain a first indication indicating whether or not the third node 113 supports or not segmentation of the message. The first indication may therefore indicate a capability of the third node 113 to support segmentation of the message.

Obtaining may comprise receiving, fetching, retrieving, etc. . . . . The first indication may be obtained by receiving it from the third node 113, e.g., via the first link 141. The first indication may often be uploaded when the third node 113 may register to the network and dual connectivity may be setup afterwards. It may also happen that dual connectivity may be enabled and disabled several times, without receiving new capabilities from the third node 113. The first indication may need to be updated, as the segmentation capabilities of the third node 113 may change, for example if the third node 113 may need to save battery.

Insome embodiments, the message may be a Radio Resource Control (RRC) message. For example, the message may be an RRC configuration or reconfiguration message.

However, embodiments herein may be generalized to other RRC messages.

It may herein be used as an example that the first node 111, e.g., an MN, may send an RRC reconfiguration message to the third node 113, e.g., a UE, which may comprise parts which may have been provided and/or created by an MN and by the first second node 114, e.g., an SN. However, this may be understood to just be one example of an RRC message for which the embodiments may be applied. Other large RRC messages may also use the same approach.

The 3GPP specifications may allow for sending an MCG+ SCG configuration message in two RRC messages: a) a RRCReconfiguration and b) an RRCResume.

By receiving the first indication in this Action 801, the first node 111 may be enabled to later determine whether or not to segment the message based on whether or not the third node 113 supports segmentation of messages.

Action 802

When setting up the radio communication with the third node 113 in coordination with the one or more second nodes 112, e.g., when setting up dual connectivity, the first node 111, e.g., the MN, may need to inform the first second node 114, e.g., a SN, about whether the first node 111 may support segmentation or not. This may require exchanging the following information between the first node 111 and the first second node 114: whether segmentation may or may not be used, and a size limit(s) that the first second node 114 may need to apply when preparing the configuration of the one or more second groups of cells 120-2, e.g., the SCG configuration. That is, the first node 111 and the first second node 114 may need to exchange information, for example, as an information exchange between MN and SN.

This information may need to be updated if the segmentation capabilities of the first node 111 and/or the first second node 114 change, for example in case of handover if either the first node 111, e.g., the MN, the first second node 114, e.g., the SN, or both, handover to a new cell with different segmentation capabilities.

This information may be exchanged over the Xn/X2 interface.

According to the foregoing, in some embodiments, the first node 111, in this Action 802, may send one or more second indications to at least one of the one or more second nodes 112, e.g., the first second node 114. The one or more second indications may indicate at least one of: i) whether or not the third node 113 supports segmentation of the message, for example, based on the received first indication in Action 801, ii) whether or not the first node 111 supports segmentation of the message, iii) a first version of the segmentation supported by the first node 111, and iv) a first size limit, a combined size limit, or both, supported by the first node 111 for segmenting the message.

A version may be based on a Radio Access Technology (RAT), and may be e.g., NR or LTE. The version may be, e.g., a PDCP version. The version may be understood to be relevant as the maximum size of the message, e.g., of the PDCP PDUs may be different in different versions, e.g., between LTE PDCP and in NR PDCP, and the first node 111 may consider the version used by the first second node 114 when determining the size of the reconfiguration information.

The size limit may be one of the following. According to a first option, the size limit may be a first size limit, a combined size limit, or both, supported by the first node 111 for segmenting the message; the first size limit may be e.g., one of a limit of the first node 111, a size limit for an SCG configuration, such as Size1 in the Single size limit cell of Table 2, or upper limit for any SCG configuration, such as Size3 in Table 2; the combined size limit may be e.g., one of a limit for sending both MCG and SCG configurations in the same PDCP packet, such as Size1 in the Two size limits or Three size limits cells of Table 2, or a limit for sending MCG and SCG configurations in different PDCP packets, such as Size2 in the Two size limits or Three size limits cells of Table 2. According to second option, the size limit may be a second size limit, a combined size limit, or both, supported by the first second node 114 for segmenting the message; the second size limit may be e.g., one of a limit of the first second node 114, a size limit for an SCG configuration, or upper limit for any SCG configuration; the combined size limit may be e.g., one of a limit for sending both MCG and SCG configurations in the same PDCP packet, or a limit for sending MCG and SCG configurations in different PDCP packets. According to third option, the size limit may be a respective second size limit, a combined size limit, or both, respectively supported by the one or more second nodes 112 for segmenting the message.

As an example, the size limit may be, e.g., a PDCP SDU size limit.

Examples of embodiments herein may comprise signalling a size limit from the MN to the SN. Which size may be signalled may depend on a number of factors, for example: which RAT may be used by MN, e.g. NR, LTE, which RAT may be used by SN, e.g. NR, LTE, if MN and/or SN support segmentation or not, if the UE supports segmentation or not, and/or the amount of packetization overhead that may be assumed, e.g. when encapsulating both MCG and SCG configurations in the same RRC message.

Determining Appropriate Size Limit

Table 1 shows a non-limiting example of how the size limit may be determined for different combinations of the above listed factors. Table 1 only covers two of the possible combinations, that is, when the MN uses LTE and the SN uses NR, and when the MN uses NR and the SN uses LTE. Other combinations may be understood to be possible.

TABLE 1

| | Example of size limit selection | |
| --- | --- | --- |
| Segmentation supported? | MN = LTE SN = NR LTE PDCP used | MN = NR SN = LTE NR PDCP used |
| LTE: No NR: No | LTE inform NR that segmentation is not supported Limit: <=8188 bytes | NR inform LTE that segmentation is not supported Limit: <=9000 bytes |
| LTE: Yes NR: No | LTE inform NR that segmentation is supported Limit: <=5*8188 bytes | NR inform LTE that segmentation is not supported Limit: <=9000 bytes |
| LTE: No NR: Yes | LTE inform NR that segmentation is not supported Limit: <=8188 bytes | NR inform LTE that segmentation is supported Limit: <=5*9000 bytes |
| LTE: Yes NR: Yes | LTE inform NR that segmentation is supported Limit: <=5*8188 bytes | NR inform LTE that segmentation is supported Limit: <=5*9000 bytes |

Yet another alternative may be to signal two or more size limits to the SN, which may then be used as described in Table 2:

TABLE 2

| Examples of one or more size limits and usage in the SN and the MN. | |
| --- | --- |
| Size limit(s) signaled to SN | Usage in SN (example) |
| Single size limit: Size1, describes the size limit for the SCG configuration | SN ensures that the SCG configuration does not exceed Size1. |
| Two size limits: Size1, describes the limit for sending both MCG and SCG configurations in the same PDCP packet Size2, describes the limit for sending MCG and SCG configurations in different PDCP packets | If segmentation is not allowed: SN may need to create an SCG configuration that is smaller than Size1. If this is not possible, then SN may need to ensure that the SCG configuration does not exceed Size2. If segmentation is allowed: SN may create an SCG configuration exceeding Size2 but not exceeding the |
| Three size limits: Size1, describes the limit for sending both MCG and SCG configurations in the same PDCP packet Size2, describes the limit for sending MCG and SCG configurations in different PDCP packets Size3, describes the upper limit for any SCG configuration (may be smaller than the UE's receiver buffer size, see the Section entitled "UE support for RRC segmentation"). | largest allowed SCG configuration size, which may depend on the UE's receiver buffer size, see the Section entitled "UE support for RRC segmentation". If segmentation is not allowed: SN may need to create an SCG configuration that is smaller than Size1. If this is not possible, then SN may need to ensure that the SCG configuration does not exceed Size2. If segmentation is allowed: SN may create an SCG configuration exceeding Size2 but not exceeding Size3. |

The sending in this Action 802 may be performed e.g., e.g., via the respective fifth links 150.

By sending the one or more second indications in this Action 801, the first node 111 may enable at least one of the one or more second nodes 112 to later determine whether or not to segment the message based on whether or not the third node 113 and/or the first node 111 support segmentation of messages, and how the segmentation may need to be performed. The first node 111 may thereby enable to ensure that a consistent segmentation approach may be applied in dual connectivity scenarios.

An alternative to signalling the size limit(s) from MN to SN may be to pre-configure the SN with one or more of these limits.

Action 803

When setting up the radio communication with the third node 113 in coordination with the one or more second nodes 112, e.g., when setting up dual connectivity, the first node 111, e.g., the MN, may also need to determine whether the first second node 114, e.g., a SN, may support segmentation, e.g., RRC segmentation, or not. This may require exchanging the following information between the first node 111 and the first second node 114: whether segmentation may or may not be used, and a size limit(s) that the first second node 114 may need to apply when preparing the configuration of the one or more second groups of cells 120-2, e.g., the SCG configuration. That is, the first node 111 and the first second node 114 may need to exchange information, for example, as an information exchange between MN and SN.

This information may also need to be updated in case of handover if either the first node 111, e.g., the MN, the first second node 114, e.g., the SN, or both, handover to a new cell with different segmentation capabilities.

This information may be exchanged over the Xn/X2 interface.

According to the foregoing, in this Action 803, the first node 111 may receive 803 one or more respective third indications from the one or more second nodes 112. The one or more respective third indications may respectively indicate at least one of: i) whether or not the one or more second nodes 112 support segmentation of the message, ii) a respective second version of the segmentation respectively supported by the one or more second nodes 112, and iii) a respective second size limit, a combined size limit, or both, respectively supported by the one or more second nodes 112 for segmenting the message.

The first node 111 may receive the one or more respective third indications from the one or more second nodes 112, e.g., via the respective fifth links 150.

By receiving the first indication in this Action 801, the first node 111 may be enabled to later determine whether or not to segment the message, and how, based on whether or not the one or more second nodes 112 support segmentation of messages, and how they support segmentation. The first node 111 may thereby be enabled to ensure that a consistent segmentation approach may be applied in dual connectivity scenarios.

Action 804

In accordance with Action 803, in this Action 804, the first node 111 may receive a third indication from the first second node 114. The third indication may respectively indicate at least one of: i) whether or not the first second node 114 supports segmentation of the message, ii) a second version of the segmentation supported by the first second node 114, and iii) a second size limit, a combined size limit, or both, supported by the first second node 114 for segmenting the message. The first node 111 may thereby be enabled to ensure that a consistent segmentation approach may be applied in dual connectivity scenarios.

The first node 111 may receive the third indication from the first second node 114, e.g., via the respective fifth link 150.

Action 805

In this Action 805, the first node 111 may determine at least one of: i) the respective second version of the segmentation supported by the one or more second nodes 112, ii) the respective second size limit, the combined size limit, or both, supported by the one or more second nodes 112 for segmenting the message, iii) the second version of the segmentation supported by the first second node 114, and iv) the second size limit, the combined size limit, or both, supported by the first second node 114 for segmenting the message.

Determining may be understood as calculating, or deriving.

To determine in this Action 805 the second size limit, the combined size limit, or both, supported by the first second node 114 for segmenting the message, one possibility is that the first node 111 may, fetch capability information from the first second node 114 to determine if the first second node 114 supports segmentation or not. Another possibility is that first second node 114 may, also in accordance with Action 804, send this information to the first node 111, even if no specific request or command was received from the first node 111. Yet another possibility is that the MN may be pre-configured with capabilities of the first second node 114.

At handover, it may happen that the segmentation capabilities of the target MN or target SN may not the same as in the source MN or SN, respectively. This may be understood to mean that this Action 805 may need to be repeated, even if no new capabilities may have been received from the third node 113.

By the first node 111 performing the determining in this Action 805, the first node 111 may be enabled to know how to perform the segmentation of the message, so that the message may be segmented in a way that may be supported by the one or more second nodes 112 in coordination with which the first node 111 may be handling the radio communication with the third node 113, so that the message is segmented in a way that may be supported for the coordinated handing, as well as optimized.

The first node 111 may thereby enable to ensure that a consistent segmentation approach may be applied in dual connectivity scenarios.

Action 806

In some embodiments wherein the first node 111 may send, in Action 802, a second indication to at least the first second node 114 indicating the first node 111 does not support segmentation, in this Action 806, the first node 111 may receive a submessage, referred to herein as a second submessage, from at least the first second node 114 to be comprised in the message to the third node 113. The second submessage may have a size under the first size limit which may require no segmentation. A submessage may be understood to refer to herein as another message to be comprised in the message to be sent.

The second submessage may have a size under the first size limit which may require no segmentation.

The first node 111 may perform this receiving Action 806, e.g., via the respective third link 143.

Action 806 may be performed, for example under the Approach 1 of examples of embodiments herein, which will be described later.

By receiving the second submessage in this Action 806, segmentation of the message in coordination with the first second node 114 may be enabled, even in cases wherein the first node 111 may not support segmentation.

Action 807

In this Action 807, the first node 111 may determine whether or not to segment the message based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 supports segmentation of messages, and v) wherein the message is sent based on a second result of the determination.

Determining may be understood as calculating, or deriving.

In examples related to embodiments herein, the determining in this Action 807 may be based on at least one of, or e.g., all of i)-iv).

In some embodiments, determining 807 whether or not to segment the message based on whether or not the size of the message exceeds the size limit may comprise further determining whether or not at least one of: a) a first submessage from the first node 111 to be comprised in the message to the third node 113 exceeds the first size limit, b) one or more second submessages respectively received from the one or more second nodes 112 and to be comprised in the message to the third node 113 exceed the respective second size limit, and c) a combination of the first submessage and the one or more second submessages exceeds the combined size limit.

In particular examples of embodiments herein, the determining in this Action 807 may comprise choosing between a fall-back approach, and two approaches based on MN and SN capabilities namely: Approach 1, also referred to herein as "Solution 1", which may be used if the MN, but not the SN, is allowed to perform downlink message, e.g., RRC message, segmentation in the coordinated radio communication, e.g., in dual connectivity scenarios, and Approach 2, also referred to herein as "Solution 2", which may be used if both the MN and the SN may be allowed to perform downlink message, e.g., RRC message, segmentation in the coordinated radio communication, e.g., dual connectivity scenarios. The two approaches as well as the choice between the two approaches are described in more detail later, with respect to FIG. 11, FIG. 12 and FIG. 13, using as an example, an RRC message, and the dual connectivity scenario. A similar description may apply to handover scenarios, as described later. A similar description may be understood to apply to the message, and to the At handover, it may happen that the segmentation capabilities of the target MN or target SN may not the same as in the source MN or SN, respectively. This may be understood to mean that this Action 807 may need to be repeated, even if no new capabilities may have been received from the third node 113. At handover, it may also happen that new capabilities from the third node 113 may be received, e.g. because the capabilities from the third node 113 have changed, which may depend on new MN and/or SN capabilities in the target MN and/or SN. It may also happen that the third node 113 may need to turn off certain features, e.g. to save battery, which may mean that the third node 113 may need to upload new capabilities of the third node 113 to the network.

By performing the determination in this Action 807, the first node 111 may be enabled to decide to segment the message only when this may be supported by the involved nodes, and only when necessary, due to the size of the message exceeding the size limit. The first node 111 may thereby enable to ensure that a consistent segmentation approach may be applied in dual connectivity scenarios.

Action 808

In this Action 808, the first node 111 may segment at least one of: a) a first submessage from the first node 111 to be comprised in the message to the third node 113, b) at least one respective second submessage received from the one or more second nodes 112 and to be comprised in the message to the third node 113, and c) a combination of the first submessage and the at least one respective second submessage.

The first submessage may be understood as a first message. The second submessage may be understood as a second submessage. One of the first submessage and the second submessage may be, e.g., an MCG reconfiguration message, and the other of the first submessage and the second submessage may be, e.g., an SCG reconfiguration message.

In some embodiments wherein the first node 111 may be a SN, and the first second node 114 may be an MN, the segmenting in this Action 808 may be performed according to a third size limit of the MN, e.g., a limit the first second node 114 may have when being MN.

In some embodiments wherein the combination of the first submessage and the one or more second submessages exceeds the combined size limit, the method may further comprise, in this Action, segmenting the combination.

The segmenting in this Action 808 may be based on a result of the determination in Action 807. That is, the first node 111 may only segment the message in this Action 808 if it has determined to do so in Action 807.

Action 809

In this Action 809, the first node 111 sends the message to the third node 113. The message is one of segmented and not segmented. Whether the message is sent segmented or not segmented is based on: i) whether or not a size of the message exceeds the size limit, ii) whether or not the third node 113 supports segmentation of messages, iii) whether or not the first node 111 supports segmentation of messages, and iv) whether or not at least the first second node 114 of the one or more second nodes 112 supports segmentation of messages.

The sending may be performed, e.g., via the first link 141.

In some embodiments wherein the first node 111 may serve the third node 113 with multiple connectivity with the one or more second nodes 112, at least one of the first node 111 and the first second node 114 may be an MN and the other may be an SN. In some of these embodiments, only the MN and the third node 113 may support segmentation.

In some embodiments wherein the first node 111 may serve the third node 113 with multiple connectivity with the one or more second nodes 112, at least one of the first node 111 and the first second node 114 may be an MN and the other may be an SN. Both the MN, the SN and the third node 113 may support segmentation. The sent message may be based on whether or not at least one of one or more second submessages from the one or more second nodes 112 to be comprised in the message to the third node 113 is segmented or not.

In some embodiments, the message may be sent based on a second result of the determination performed in Action 807.

In some embodiments, the message may be sent based on a third result of the further determination performed in Action 807.

In some embodiments, the message may be sent based on a first result of the segmentation performed in Action 808.

By performing the sending in this Action 809, the first node 111 may be enabled to send the message in the coordinated radio communication with the one more second nodes 112, only when segmentation may be supported by the involved nodes, and only when necessary, due to the size of the message exceeding the size limit, thereby optimizing the processing of the message as well as the radio resources in the wireless communications network 100. The first node 111 may thereby enable to ensure that a consistent segmentation approach may be applied in dual connectivity scenarios.

Examples of these actions and the indications are provided later in this document.

Embodiments of a method performed by the first second node 114, will now be described with reference to the flowchart depicted in FIG. 9. The method may be understood to be for handling the message to the third node 113. The message comprises content from at least the first second node 114 of the one or more second nodes 112. That is, the message may comprise content from at least one of the one or more second nodes 112. The first second node 114 handles the radio communication with the third node 113 in coordination with, at least, the first node 111. In some examples, the first second node 114 may handle the radio communication with the third node 113 in coordination with the first node 111 and the one or more second nodes 112. For example the coordination of the radio communication may be based on multiconnectivity, e.g., dual connectivity, based on a handover, or based on a split architecture.

The first second node 114 operates in the wireless communications network 100.

In some embodiments, the message may be an RRC message. For example, the message may be an RRC configuration or reconfiguration message.

The method may be understood to be a computer-implemented method.

The method may comprise the following actions. Several embodiments are comprised herein. In some embodiments all the actions may be performed. In some embodiments, two or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first second node 114 is depicted FIG. 9. Some actions may be performed in a different order than that shown in FIG. 9.

Figure 9:
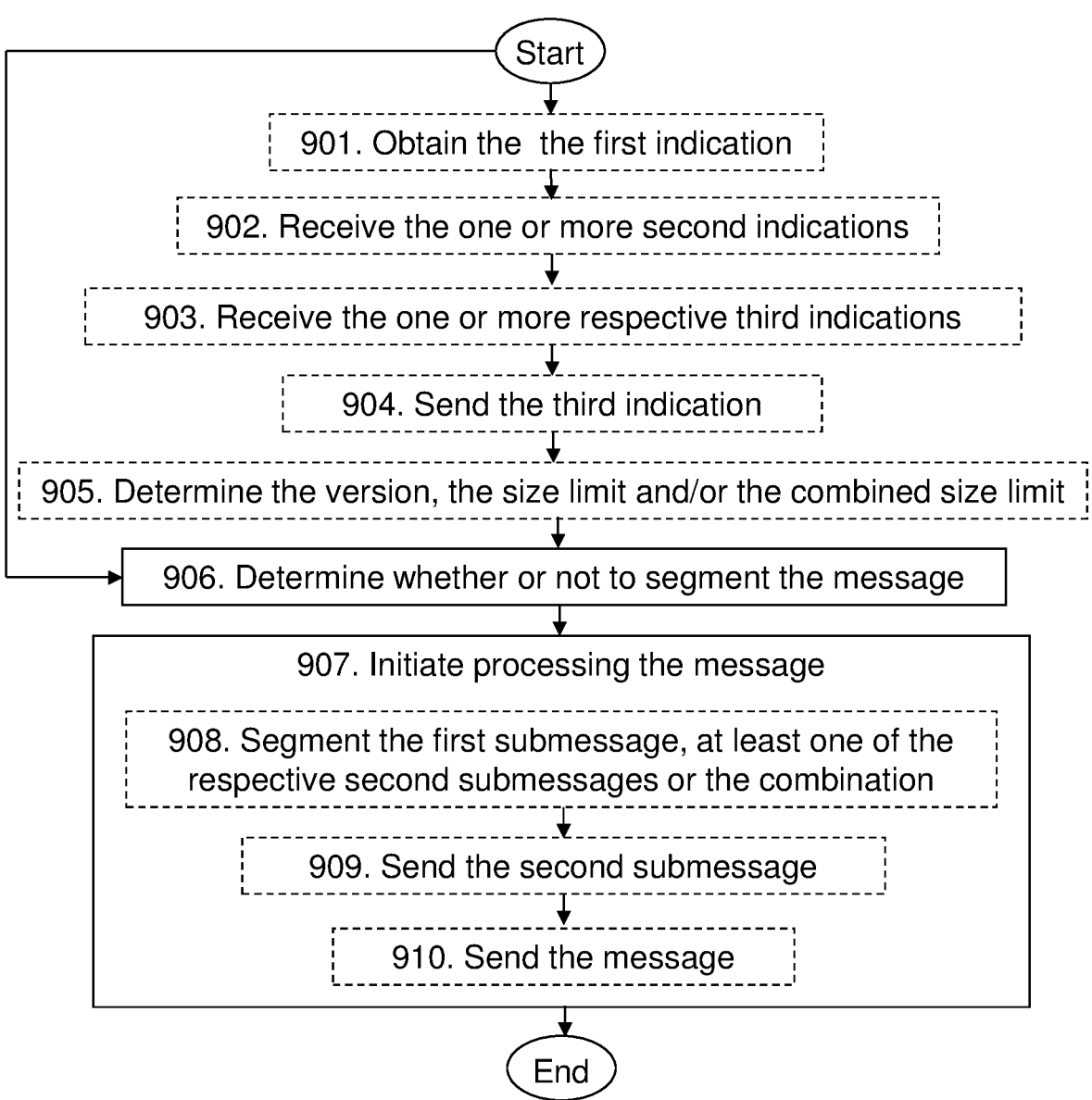
FIG. 9 is a flowchart depicting an example of a method in a first second node, according to embodiments herein.

In FIG. 9, optional actions are depicted with dashed lines.

The detailed description of some of the following corresponds to the same references provided above, in relation to the actions described for the first node 111 and will thus not be repeated here to simplify the description. For example, in some embodiments, at least one of the following options may apply. In a first option, first second node 114 may serve the third node 113 with multiple connectivity with the first node 111, the one or more second nodes 112 or both.

In a second option, the first second node 114 may be to handover the connection, e.g., the radio communication, with the third node 113 to or from the first node 111.

In a third option, the first node 111 may be a Master Node (MN) for the third node 113 and the one or more second nodes 114 may be Secondary Nodes (SNs) for the third node 113 in the multiple connectivity.

In a fourth option, the first second node 114 may be an MN for the third node 113 and the first node 111 and the other one or more second nodes 121 may be SNs for the third node 113 in the multiple connectivity.

In a fifth option, the first node 111 may be a source node for the third node 113 and the first second node 114 may be a target node for the third node 113, e.g., in a handover scenario.

In a sixth option, the first node 111 may be a target node for the third node 113 and the first second node 114 may be a source node for the third node 113, e.g., in a handover scenario.

In a seventh option, the first node 111 may be a DU and the first second node 114 may be a CU, e.g., in a split architecture scenario.

In an eighth option, the first node 111 may be a CU and each of the one or more second nodes 112 may be a DU, e.g., in a split architecture scenario.

In a ninth option, the first node 111 may be a first DU and any of the one or more second nodes 112 may be another DU, e.g., in a split architecture scenario.

The multiple connectivity, e.g., dual connectivity, may be Multi Radio (MR) multiconnectivity or multiple connectivity.

In some embodiments, at least one of the first node 111 and the first second node 114 may be an MN and the other may be an SN. In some of these embodiments, only the MN and the third node 113 may support segmentation. In some other of these embodiments, both the MN, the SN and the third node 113 may support segmentation.

Action 901

In this Action 901, the first second node 114 may obtain the first indication indicating whether or not the third node 113 supports or not segmentation of the message.

Obtaining may comprise receiving, fetching, retrieving, etc. . . . . The first indication may be obtained by receiving it from the third node 113, e.g., via the respective third link 143.

Action 902

In this Action 902, the first second node 114 may receive the one or more second indications from the first node 111. The one or more second indications may indicate at least one of: i) whether or not the third node 113 supports segmentation of the message, ii) whether or not the first node 111 supports segmentation of the message, iii) the first version of the segmentation supported by the first node 111, and iv) the first size limit, the combined size limit, or both, supported by the first node 111 for segmenting the message.

As stated earlier, a version may be based on a RAT, and may be e.g., NR or LTE.

The first second node 114 may receive the one or more second indications from the first node 111, e.g., via the respective fifth link 150.

Action 903

In this Action 903, the first second node 114 may receive the one or more respective third indications from the one or more second nodes 112. The one or more respective third indications may respectively indicate at least one of: i) whether or not the one or more second nodes 112 support segmentation of the message, ii) the respective second version of the segmentation respectively supported by the one or more second nodes 112, and iii) the respective second size limit, the combined size limit, or both, respectively supported by the one or more second nodes 112 for segmenting the message.

The first second node 114 may receive the one or more respective third indications from the one or more second nodes 112, e.g., via respective links.

Action 904

In this Action 904, the first second node 114 may send the third indication to at least one of the first node 111 and the other nodes of the one or more second nodes 112. The third indication may respectively indicate at least one of: i) whether or not the first second node 114 supports segmentation of the message, ii) the second version of the segmentation supported by the first second node 114, and iii) the second size limit, the combined size limit, or both, supported by the first second node 114 for segmenting the message.

Action 905

In this Action 905, the first second node 114 may determine at least one of: i) the respective second version of the segmentation supported by the one or more second nodes 112, ii) the respective second size limit, the combined size limit, or both, supported by the one or more second nodes 112 for segmenting the message, iii) the first version of the segmentation supported by the first node 111, and iv) the first size limit, the combined size limit, or both, supported by the first node 111 for segmenting the message.

The first second node 114 may additionally or alternatively determined the second size limit, the combined size limit, or both, supported by the first second node 114 for segmenting the message.

Determining may be understood as calculating, or deriving.

Action 906

In this Action 906, the first second node 114 determines whether or not to segment the message based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 supports segmentation of messages.

Determining may be understood as calculating, or deriving.

In examples related to embodiments herein, the determining in this Action 906 may be based on at least one of, or e.g., all of i)-iv).

In some embodiments, the determining in this Action 906 of whether or not to segment the message based on whether or not the size of the message exceeds the size limit may comprise further determining whether or not at least one of: a) the first submessage from the first node 111 to be comprised in the message to the third node 113 exceeds the first size limit, b) the second submessage from the first second node 114 to be comprised in the message to the third node 113 exceeds the second size limit, c) the one or more respective second submessages respectively received from the one or more second nodes 112 and to be comprised in the message to the third node 113 exceed the respective second size limit, and c) the combination of the first submessage and the second submessage and/or the one or more respective second submessages exceeds the combined size limit.

In particular examples of embodiments herein, the determining in this Action 906 may comprise choosing between the fall-back approach, the Approach 1, and the Approach 2, as described earlier, and further down below.

Action 907

In this Action 907, the first second node 114 initiates processing the message based on a fourth result of the determination. To initiate processing the message may comprise one or r more of Action 908, Action 909 and Action 910, as described next.

Action 908

In some embodiments, the initiating processing 907 the message may comprise that, in this Action 908, the first second node 114 may segment at least one of: a) the second submessage from the first second node 114 to be comprised in the message to the third node 113, b) the first submessage from the first node 111 to be comprised in the message to the third node 113, c) at least one respective second submessage received from the one or more second nodes 112 and to be comprised in the message to the third node 113 and d) the combination of the first submessage and the at least one of the second submessage and the at least one respective second submessages. The segmenting in this Action 908 may be based on the fourth result of the determination.

In some embodiments wherein the combination exceeds the combined size limit, the method may further comprise, in this Action, segmenting the combination.

In some embodiments, the combination of the first submessage and the one or more second submessages may exceed the combined size limit, and the method may further comprise segmenting 908 the combination.

In some embodiments wherein the first node 111 may be a SN, and the first second node 114 may be an MN, the segmenting in this Action 908 may be performed according to the third size limit of the MN, e.g., a limit the first second node 114 may have when being MN.

The segmenting in this Action 908 may be based on a fourth result of the determination in Action 906.

A submessage may be understood to refer to herein as another message to be comprised in the message to be sent. The first submessage may be understood as a first message. The second submessage may be understood as a second submessage. One of the first submessage and the second submessage may be, e.g., an MCG reconfiguration message, and the other of the first submessage and the second submessage may be, e.g., an SCG reconfiguration message.

Action 909

In some embodiments, wherein the first second node 114 may receive the second indication indicating the first node 111 does not support segmentation, the initiating processing 907 the message may comprise that, in this Action 909, the first second node 114 may send the second submessage to the first node 111, to be comprised in the message to the third node 113. The second submessage may have a size under the first size limit which may require no segmentation.

In some embodiments, the message may be sent based on a fifth result of the further determination performed in Action 906.

The first second node 114 may perform this sending Action 909, e.g., via the respective fifth link 150.

Action 910

In some embodiments, the initiating processing 907 the message may comprise that, in this Action 910, the first second node 114 may send the message to the third node 113. The message may be one of segmented and not segmented. Whether the message is sent segmented or not segmented may be based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 supports segmentation of messages. For example: whether or not the one or more second nodes 112 support segmentation of messages.

The size limit may be e.g., a PDCP SDU size limit.

The size limit may be one of: a) the first size limit, the combined size limit, or both, supported by the first second node 114 for segmenting the message; b) the second size limit, the combined size limit, or both, supported by the first second node 114 for segmenting the message; and c) the respective second size limit, the combined size limit, or. both, respectively supported by the one or more second nodes 112 for segmenting the message.

In examples related to embodiments herein, whether the message is sent segmented or not segmented may be based on at least one of, or e.g., all of i)-iv).

The sending may be performed, e.g., via the third link 143.

In some embodiments wherein the first second node 114 may serve the third node 113 with multiple connectivity with the one or more second nodes 112 and the first node 111, at least one of the first node 111 and the first second node 114 may be an MN and the other may be an SN. In some of these embodiments, only the MN and the third node 113 may support segmentation.

In some embodiments wherein the first second node 114 may serve the third node 113 with multiple connectivity with the one or more second nodes 112 and the first node 111, at least one of the first node 111 and the first second node 114 may be an MN and the other may be an SN. Both the MN, the SN and the third node 113 may support segmentation. The determining in Action 906 may be based on whether or not at least one of one or more respective second submessages from the one or more second nodes 112 to be comprised in the message to the third node 113 may be segmented or not.

The message may be sent based on a first result of the segmentation.

The message may be sent based on a second result of the determination performed in Action 906.

The message may be sent based on a fifth result of the further determination performed in Action 906.

Examples of these actions and the indications are provided later in this document.

Some embodiments herein will now be further described with some non-limiting examples.

In the following description, any reference to a/the MN, or simply "MN" may be understood to equally refer to any of the first node 111, the one or more second nodes 112 and the first second node 114; any reference to a/the SN, or simply "SN", may be understood to equally refer to the other of the first node 111, the one or more second nodes 112 and the first second node 114, namely if the MN is understood to be the first node 111, the SN is understood to be the first second node 114 or any of the one or more second nodes 112, and if the MN is understood to be the any of the one or more second nodes 112 or the first second node 114, the SN is understood to be first node 111; any reference to a/the UE, or simply, "UE", may be understood to equally refer to the third node 113; any reference to a/the X2 or Xn interface may be understood to equally refer to the respective fifth link 150; LTE may be taken as a non-limiting example of a first radio technology, e.g., first radio access technology, and NR may be taken as a non-limiting example of a second radio technology, e.g., second radio access technology. Any reference to the RRC message may be understood to equally apply to the message. Any reference to the dual connectivity scenario, or to handover, may be understood to equally apply to the coordinated radio communication between the first node 111 and the one or more second nodes 112, e.g., the first second node 114.

Some examples of embodiments herein may be understood to define MN and SN behavior to handle RRC messages that may exceed the PDCP limit for LTE and NR. Further particularly, some examples of embodiments herein may be understood to provide methods to handle segmentation of RRC messages in dual connectivity scenarios and may be understood to define MN and SN behavior in this regard. Examples of embodiments herein may be understood to propose two approaches based on MN and SN capabilities namely:

Approach 1, also referred to herein as "Solution 1": may be used if the MN, but not the SN, is allowed to perform downlink RRC message segmentation in dual connectivity scenarios. Approach 1 is described in detail in regards to the FIG. 12.

Approach 2, also referred to herein as "Solution 2": may be used if both the MN and the SN may be allowed to perform downlink RRC message segmentation in dual connectivity scenarios. Approach 2 is described in detail in regards to the FIG. 13.

The two approaches are described in more detail below.

Examples of embodiments herein may be understood to also provide methods for how to exchange information between the MN and the SN about support for segmentation to ensure a consistent segmentation solution in dual connectivity scenarios.

Examples of embodiments herein may be understood to include processing both for the dual connectivity setup phase and for the run-time phase.

Figure 10:
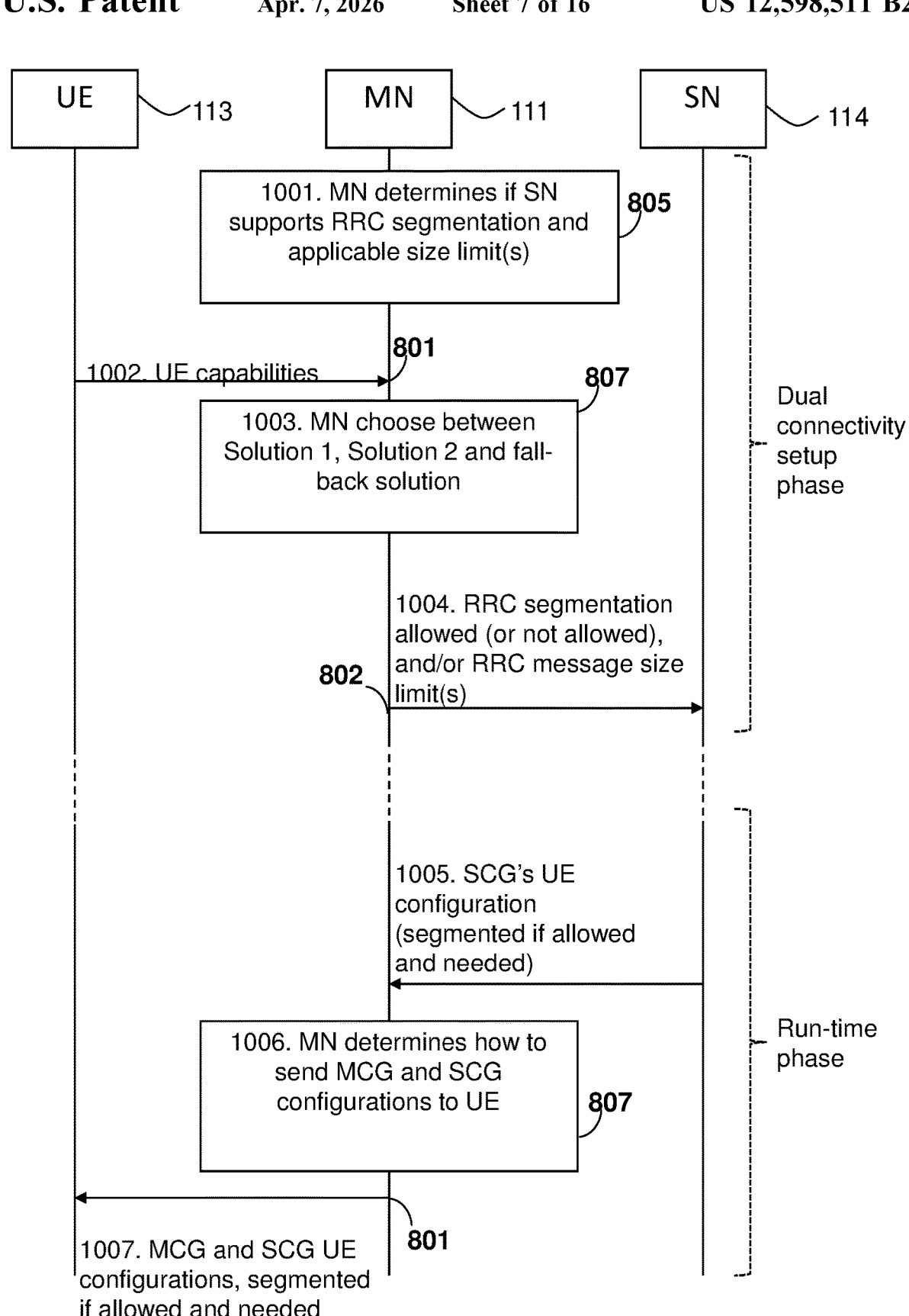
FIG. 10 is a signalling diagram illustrating a non-limiting example of methods in a wireless communications network, according to embodiments herein.

FIG. 10 is a schematic signalling diagram describing one non-limiting example of the high-level signalling flow between the third node 113, here a UE, the first node 111, here a MN, and the first second node 114, here, a SN, according to embodiments herein for, particularly, RRC segmentation of the message. Other variants may exist, which will be described in a number of examples. At Step 1001, the first node 111 determines, in accordance with Action 805, if the first second node 114 supports RRC segmentation and the applicable size limit(s). Step 1001 may be performed in several ways. One possibility is that the MN may, in accordance with Action 804, fetch capability information from the SN to determine if the SN supports RRC segmentation or not. Another possibility is that SN may, also in accordance with Action 804, send this information to the MN, even if no specific request or command was received from the MN. Yet another possibility is that the MN may be pre-configured with SN's capabilities. In addition, the MN may determine also other information relevant for the RRC segmentation, for example, but not limited to: which size limitations may apply in the SN; or a maximum number of segments allowed. At Step 1002, the first node 111 may obtain the first indication from the third node 113 indicating its UE capabilities, in accordance with Action 801. Steps 1001 and 1002 may not need to be performed in the order described in FIG. 10. Step 1002 may also be performed before step 1001 because the UE capabilities may often be uploaded when the UE may register to the network and dual connectivity may be setup afterwards. It may also happen that dual connectivity may be enabled and disabled several times, without receiving new UE capabilities from the UE. At handover, it may happen that the segmentation capabilities of the target MN or target SN may not the same as in the source MN or SN, respectively. This may be understood to mean that step 1001 may need to be repeated, even if no new UE capabilities may have been received from the UE. At handover, it may also happen that new UE capabilities may be received, e.g. because the UE capabilities have changed, which may depend on new MN and/or SN capabilities in the target MN and/or SN. It may also happen that the UE may need to turn off certain features, e.g. to save battery, which may mean that the UE may need to upload new UE capabilities to the network. At Steps 1003, as part of Action 807, the MN may determine, after receiving the UE capabilities, whether RRC segmentation may or may not be used for the current UE. As part of Action 807, the MN may choose between Solution 1, the Solution 2 and the fallback solution. Then, at Step 1004, the MN may, in accordance with Action 802, send this information to the SN. There may be, however, several alternatives to this. One alternative may be that MN may, in accordance with Action 802, send its own RRC segmentation capabilities to the SN earlier in the initialization phase, possibly even before receiving the UE capabilities, and may then forward the UE capabilities, or a subset, to the SN. In this case, the MN may delegate to the SN to determine whether RRC segmentation may or may not be used for the current UE. Accordingly, in embodiments herein, the first node 111 may be understood as the node that may determine whether the segmentation of the message may or may not be used for the third node 113, after having gathered the information from the nodes involved in the coordinated radio communication, whether the first node 111 is an MN or the SN. Yet another alternative may be to only signal, as an example of the one or more second indications, the "RRC message size limit" to the SN, which may then implicitly also describe if the SN may be allowed to use RRC segmentation or not. Yet another alternative to signal the "RRC message size limit" may be to signal the "PDCP message size limit" or the "SCG message configuration size limit". Step 1004 may also need to be updated if the segmentation capabilities of the MN and/or the SN change, for example after a handover to another cell where the target MN and/or the SN may have different segmentation capabilities than before the handover. The UE's segmentation capabilities may also change, for example if the UE may need to save battery. Steps 1001, 1002, 1003 and 1004 may be comprised in a dual connectivity setup phase. As part of a run-time phase, the first node 111 may, at Step 1005, receive, from the first second node 114 the SCG's UE configuration, segmented, if allowed and needed, to be comprised in the message to be sent by the first node 111 to the third node 113. At Step 1006, in accordance with Action 807, the first node 111 may determine how to send MCG and SCG configurations to the UE. Finally, at Step 1007, in accordance with Action 809, the first node 111 may send the message to the third node 113, comprising the MCG and SCG configurations, segmented if allowed and needed, as determined in Action 807.

FIG. 11 is a signalling diagram showing one non-limiting example flow chart for choosing approach, as part of Action 807, or Action 906, that is the choosing between the fallback approach, Approach 1 and Approach 2, according to embodiments herein. Other flow charts may be possible. While the steps are described as being performed by the first node 111, they may alternatively be performed by the node making the determination, e.g., the first second node 114 in some examples. At Step 1101, the first node 111 may determine whether or not the third node 113, represented as UE in FIG. 11, supports RRC segmentation, e.g., based on the received first indication. If not, the first node 111 may determine to use the fallback approach. The fall-back approach may be understood to comprise to use existing methods to send the MCG and SCG configurations to the UE and is therefore not further described. If the third node 113 supports RRC segmentation, the first node 111 may then determine whether the MN and/or the SN support RRC segmentation. If neither the MN and/or the SN support RRC segmentation, the first node 111 may determine to use the fallback approach. If only the MN supports RRC segmentation, the first node 111 may determine to use Approach 1. If both the MN and the SN support RRC segmentation, the first node 111 may determine to use Approach 2.
Detailed Description of Approach 1

Figure 12:
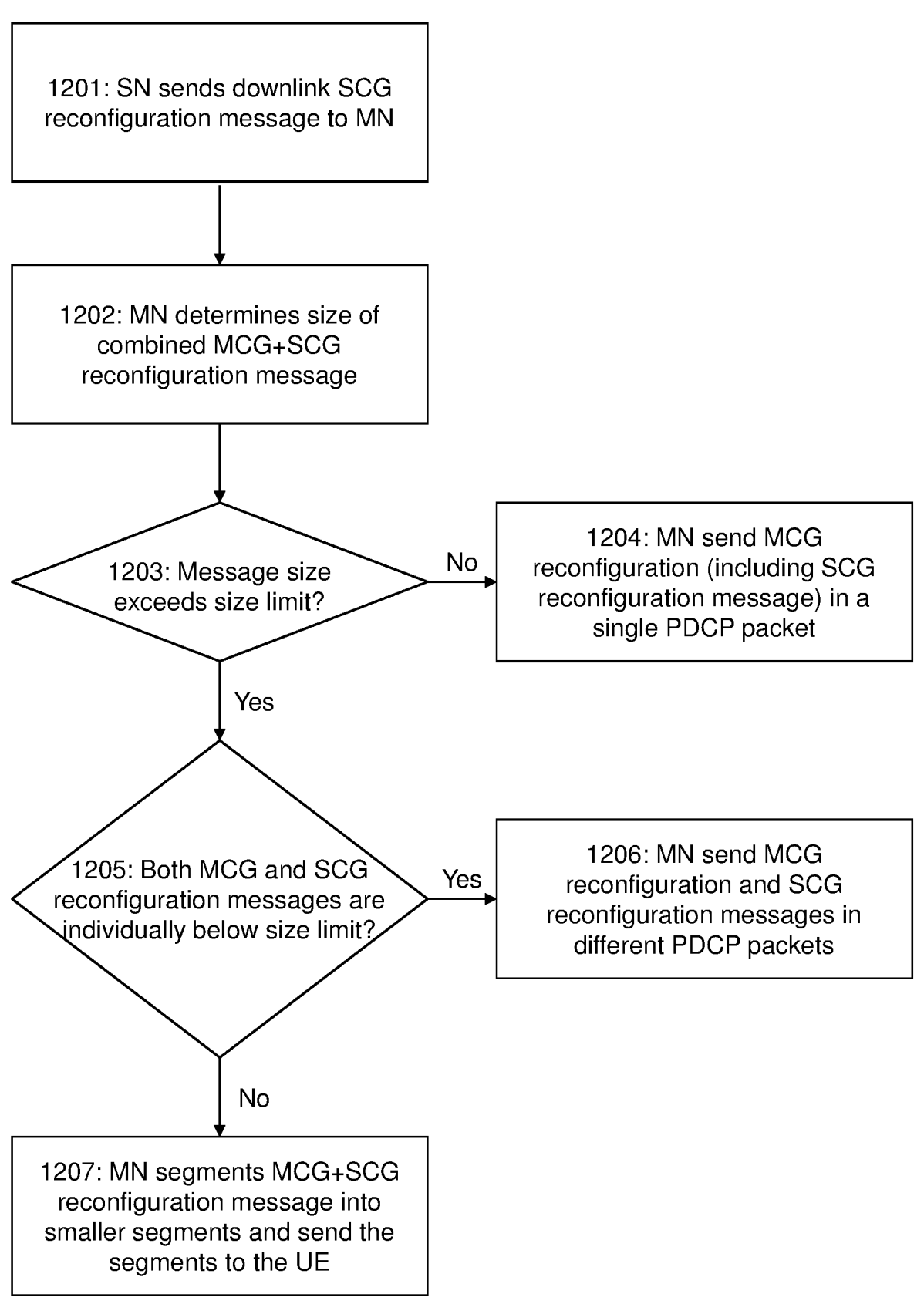
FIG. 12 is a signalling diagram illustrating yet another non-limiting example of methods in a wireless communications network, according to embodiments herein.

According to the first approach, Approach 1, only the MN may be allowed to perform downlink RRC message segmentation in dual connectivity scenarios. A non-limiting example flow chart for Approach 1 is shown in FIG. 12. In this approach, both the MN and the third node 113, e.g., a UE support RRC segmentation in DL, but the SN does not. At Step 1201, the SN sends a DL SCG reconfiguration message to the MN. When the MN receives an SCG reconfiguration from the SN, at Step 1202 the MN may determine the size of the combined MCG+SCG reconfiguration message. At Step 1203, the MN, e.g., according to Action 807, may determine if the message size of the combined MCG+SCG reconfiguration message, the MCG reconfiguration message including the SCG reconfiguration message, may exceed the PDCP SDU size limit. At Step 1204, If the size does not exceed the PDCP SDU size limit, the MN may use existing approaches to send the MCG and SCG reconfiguration in a single PDCP packet to the third node 113. At Step 1205, the MN may determine if both, the MCG and the SCG reconfiguration messages are individually below the size limit. At Step 1206, if the size of the combined MCG+SCG reconfiguration message exceeds the PDCP SDU size limit, but neither of the two reconfiguration messages exceeds the PDCP SDU size limit, then MN may be use existing approaches to send the MCG and SCG reconfiguration messages in different PDCP packets to the third node 113. At Step 1207, if the size exceeds the PDCP SDU size limit, and if either of the two reconfiguration messages exceeds the PDCP SDU size limit, then MN may segment the combined MCG+SCG reconfiguration message. Alternatively, not shown in the FIG. 12, if only one of the two MCG and SCG reconfiguration messages exceeds the PDCP SDU size limit, then the MN may also choose to segment only the reconfiguration message that exceeds the size limit and send the other reconfiguration message in a separate PDCP packet. Alternatively, not shown in the FIG. 12, if both the MCG and SCG reconfiguration messages exceed the PDCP SDU size limit, then the MN may segment them individually, without combining them into the combined MCG+SCG reconfiguration message.

Several alternatives are possible for Approach 1, which are described in the embodiments below.

1.1 Example 1

In one example of embodiments herein, the following sequence may be used in the MN when handling SN based RRC reconfiguration messages. The SN may send the downlink SCG RRC reconfiguration message via backhaul to the MN. The RRC reconfiguration message may potentially exceed the maximum PDCP SDU size of configured SRBs. The MN embeds the SCG RRC reconfiguration message into an MCG RRC reconfiguration message. The resulting message exceeds the maximum PDCP SDUs size of the configured SRB. The MN may segment the resulting MCG RRC reconfiguration message into segments smaller than or equal to the maximum PDCP SDUs size of the configured SRB and may deliver the segments to the PDCP entity for transmission towards the third node 113, e.g., a UE. The difference, compared to what is described above for Approach 1, may be understood to be that the MN may not determine if it would be possible to send the MCG and SCG reconfiguration messages in separate PDCP packets but may go directly to segmenting the combined MCG+SCG reconfiguration message, e.g., according to Action 308, if performed by the first node 111.

1.2 Example 2

In another example of embodiments herein, the MN may inform the SN about the MN's support for segmentation, e.g., as described in Action 802. This may for example be done in the initial configuration messages, e.g., CG-config/CG-configinfo, over the Xn/X2 interface. Another possibility is that this may be done during the setup of the Xn/X2 interface.

1.3 Example 3

In yet another example based upon example 2 above, if the MN indicates to SN that segmentation is not supported by the MN, the third node 113, e.g., a UE or both, the SN may make sure that the size of the reconfiguration message does not exceed the PDCP size limit of MN.

1.4 Example 4

In yet another example, the SN, when it may send the SCG reconfiguration information to the MN, may consider information about the type of PDCP entity the MN may use for sending the RRC messages to the UE. For example, the SN may consider whether the MN may use an LTE PDCP entity, defined in 3GPP TS 36.323, version 16.0.0, or whether the MN may use an NR PDCP entity, defined in 3GPP TS 38.323, version 16.0.0. The maximum size of the PDCP PDUs may be different in LTE PDCP and in NR PDCP, and the SN may consider the version used by the MN when determining the size of the reconfiguration information. If the SN determines that the MN uses LTE PDCP, the SN may ensure that the reconfiguration information is small enough, considering additional information which may be added by the MN, to fit within the LTE PDCP limit, while if the SN determines that the MN uses NR PDCP for sending the reconfiguration information to the UE, the SN may consider the size limit associated with the NR PDCP specification.

The SN may determine which PDCP version the MN may use based on an indication, e.g., one of the one or more indications sent in Action 802, from the MN. Alternatively, the SN may determine which PDCP version the MN may use considering which type of node the MN is, e.g. if the node is an NR node the SN may determine that the MN uses NR PDCP for sending the reconfiguration information to the UE, while if the MN is an LTE node then the SN may not know implicitly whether the MN may be using LTE PDCP or NR PDCP. For this case, the SN may determine the PDCP version. If the SN cannot determine explicitly which PDCP version the MN uses, the SN may assume that the MN uses the PDCP version with the smallest size for the PDCP PDUs, e.g., the LTE PDCP.

Another approach allowing the SN to determine which PDCP version is used by the MN may be for the SN to determine this based on the RRC configuration which may apply for the UE in the MN. Or in the case of handover, as described below in the section entitled "Handover", the target may determine this based on the configuration the UE has in the source-node.

1.5. Example 5

In another example, the source may determine whether the third node 113, e.g., a UE, supports DL RRC segmentation. And the SN may ensure that the size of the reconfiguration message does not exceed the PDCP size limit at the MN, considering also potential overhead added at the MN. In one version of this example, the SN may determine this based on the first indication e.g., the UE capabilities. The SN may get the UE capabilities from the MN during the establishment of the Dual Connectivity. In case of handover, see later section, the SN may get the capabilities for the UE during the handover preparation phase.

Detailed Description of Approach 2

Figure 13:
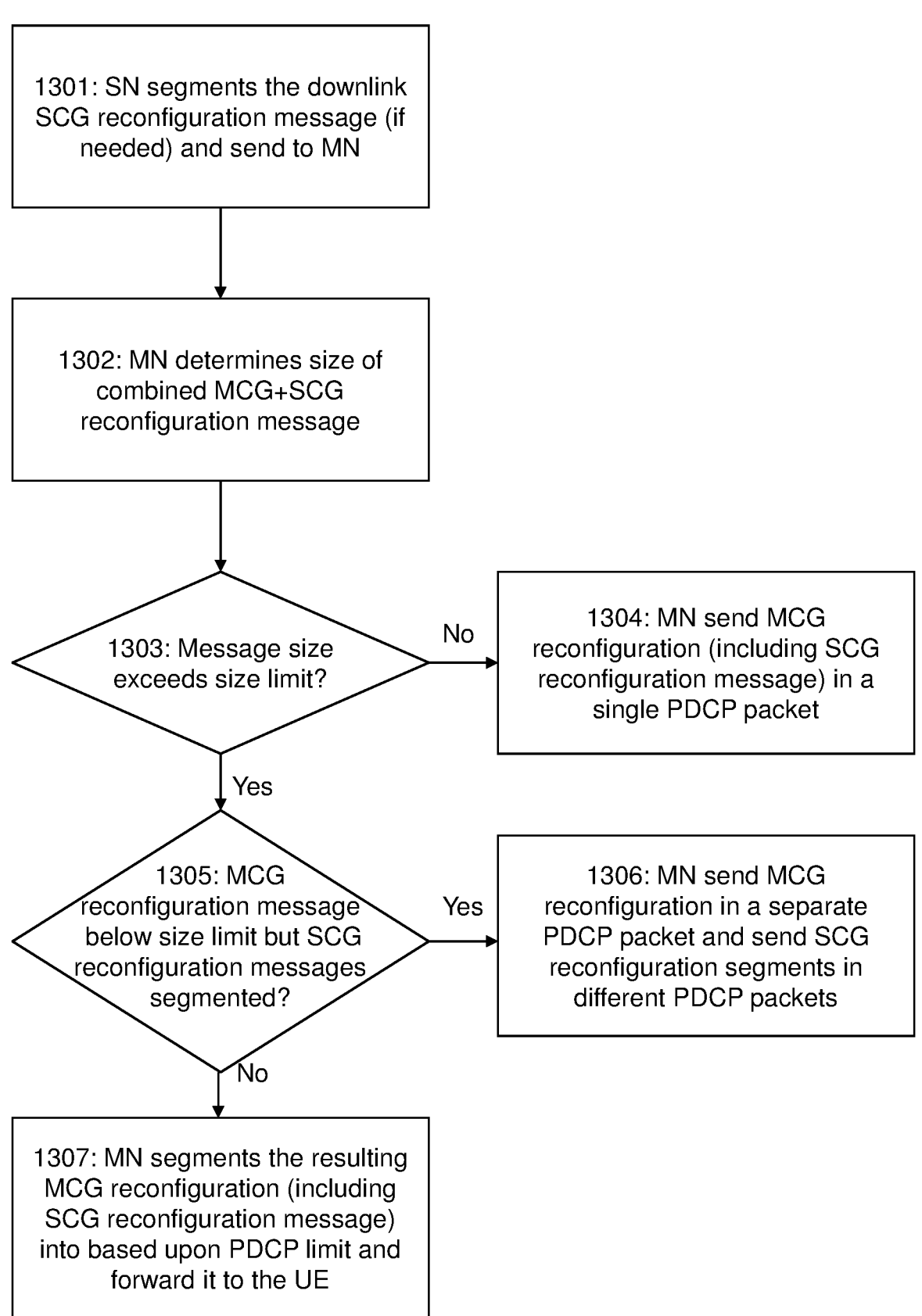
FIG. 13 is a signalling diagram illustrating a further non-limiting example of methods in a wireless communications network, according to embodiments herein.

In Approach 2, both MN and SN may be allowed to perform downlink RRC message segmentation in dual connectivity scenarios. A non-limiting example flow chart for Approach 2 is shown in FIG. 13. In this approach, both MN and SN may support RRC segmentation in DL. Since both MN and SN may support RRC segmentation, at Step 1301, the SN may segment the SCG reconfiguration message, if needed, before sending it to the MN. At Step 1302, the MN may then determine the size of the MCG reconfiguration message, including the SCG reconfiguration message. At Step 1303, the MN may, e.g., according to Action 807, determine if the size of the message exceeds the size limit. At Step 1304, if the size does not exceed the PDCP SDU size limit, the MN may use existing approaches to send the MCG and SCG reconfiguration in a single PDCP packet to the UE. At Step 1305, the MN may determine, e.g., according to Action 807, if the MCG reconfiguration message is below the size limit, but the SCG reconfiguration messages are segmented. If the size of the combined MCG+SCG reconfiguration message exceeds the PDCP SDU size limit, but neither of the two reconfiguration messages exceeds the PDCP SDU size limit, then MN may use existing approach to send, e.g., according to Action 809, the MCG and SCG reconfiguration messages in different PDCP packets to the UE. At Step 1306, if the SCG reconfiguration message has already been segmented by the SN, then MN may send, e.g., according to Action 809, the MCG reconfiguration message, segmented, if needed, separately from the SCG reconfiguration message to the UE. At Step 1307, if the MCG reconfiguration message, without including the SCG reconfiguration message, exceeds the size limit, then MN may create the combined MCG+SCG reconfiguration message and, e.g., according to Action 808, segment this before sending to the UE. Alternatively, not shown in FIG. 13, if the SCG reconfiguration message has been segmented but with a segment size not matching the segment size for MN, then MN may merge the SCG reconfiguration messages and perform a new segmentation, e.g., according to Action 808. This may include first creating the combined MCG+SCG reconfiguration message.

Several alternatives a may be re possible for Approach 2, which are described in the examples below.

2.1 Example 6

In one example of Approach 2, both the MN and the SN may exchange support for segmentation in the initial DC setup using, e.g., CG-config/CG-configinfo, messages over X2 or Xn interface, e.g., According to Action 802, Action 803, and Action 804.

2.2 Example 7

In another example of embodiments herein, if both the MN and the SN support segmentation, but the third node 113, e.g., a UE, does not support segmentation, the MN may inform, e.g., according to Action 802, the SN over the X2 or Xn interface that UE does not support segmentation.

2.3 Example 8

In yet another example of embodiments herein, the following sequence may be followed while handling SN based RRC reconfiguration messages. The SN may segment the SCG RRC message and may send the SCG RRC reconfiguration messages via backhaul to the MN, the RRC reconfiguration message potentially exceeding the maximum PDCP SDU size of configured SRBs. The MN may embed the segmented SCG RRC reconfiguration message into the MCG RRC reconfiguration message, the resulting RRC reconfiguration message may exceed the maximum PDCP SDUs size of configured SRB. If the resulting message exceeds the PDCP limit, the MN may, e.g., according to Action 808, segment the resulting MCG RRC reconfiguration message into smaller segments based upon the maximum PDCP SDUs size of currently configured SRB and may deliver the segments to the PDCP entity for transmission towards the third node 113, e.g., a UE. This may be understood to mean replacing steps 1002-1005 and directly merging the MCG and SCG reconfiguration messages and only determining if the combined MCG+SCG reconfiguration message exceeds the PDCP SDU size limit.

2.4 Example 9

In one variant of example 8, the SN may segment the SCG reconfiguration message into smaller segments in a way that each segment may not exceed the PDCP limit of the MN node. This may be understood to mean segmenting according to the MN's size limit instead of segmenting according to the SN's size limit.

2.5 Example 10

In another variant of example 8, the MN may provide, e.g., according to Action 802, to the SN an estimate of the MCG reconfiguration message size, or the size that the SN may use for the SCG reconfiguration message, in the initial configuration messages, e.g., CG-config/CG-configinfo, over the Xn/X2 interface. There may be two possibilities in terms of the estimate. The MN may either provide an estimate of the MCG reconfiguration content in each segment along with the segment or the total size of the RRC reconfiguration message. Based on the two options, the SN may then create segments of SCG reconfiguration messages based on the following examples. According to a first option, if the MN provides an estimate of the MCG reconfiguration content in each segment, the SN may segment the SCG reconfiguration message in a way that all SCG reconfiguration messages segments may be able to fit together with the MCG reconfiguration message considering MN PDCP limit. According to a second option, if the MN provides an estimate of the total MCG reconfiguration content, the SN may segment the SCG reconfiguration message in a way that the first SCG reconfiguration message segment may be able to fit with the MCG reconfiguration message and the rest of the SCG reconfiguration segments may be built considering the complete MCG segment may be available for the SCG reconfiguration segment.

Handover

The above examples have been described methods for how, in a Dual/Multi connectivity scenario, a master node (MN) and a secondary node (SN) may behave in order to ensure that the configuration message can be sent to the third node 113, e.g., a UE, which may contain both components generated by the MN and components generated by the SN.

It may be appreciated that the Dual Connectivity scenario is just an example scenario wherein the methods may be applied. Another scenario where the methods may be applied is for handover.

When a handover is performed in e.g., NR or in LTE, the network may send an RRCReconfiguration message to the third node 113, e.g., a UE, or RRCConnectionReconfiguration as the message is called in LTE. This reconfiguration message may be generated by the target node, that is, the note towards which the third node 113 may move.

Also in the handover scenario there may arise a situation where the, by the target, wanted configuration may result in a reconfiguration message which may be too big and hence exceed the size limit in the PDCP layer.

Similarly for how, according to some embodiments and/or examples above, it is described how an SN may get an indication from the MN indicating whether or not the MN supports segmentation of DL RRC messages, in a handover scenario, the corresponding embodiment may be that the source may indicate to the target whether the source may support RRC segmentation. This information may then be considered by the target node when determining which size limitation to consider when generating the reconfiguration-message, e.g., the handover-message.

The person skilled in the art may appreciate how other embodiments described above may in a similar analogous way be applied to the handover scenario as to the Dual Connectivity scenario.

Particular examples of embodiments herein or related to embodiments herein may be as follows:

In these particular examples, the first node is the SN and the second node is the MN in case of dual connectivity, while in handover the first node is the target node while the second node is the source node.

Particular example 1: A method in a first node for providing configuration information for a UE via a second node comprising:

receiving an indication from a second node (the MN) indicating whether the second node supports DL RRC segmentation, e.g., according to Action 902, receiving an indication indicating whether the UE supports DL RRC segmentation, e.g., according to Action 901 or Action 902, if the second node and the UE support DL RRC segmentation, apply a first, e.g., large, limit for reconfiguration information for the UE, e.g., according to Action 905, if not both of second node and the UE supports DL RRC segmentation, apply a second, e.g., small, limit for reconfiguration information for the UE e.g., according to Action 905.

Particular example 2: A method in a second node for sending reconfiguration to a UE which at least partially is constructed by a first node comprising:

providing an indication to the second node indicating support or non-support of segmentation of reconfiguration messages, e.g., according to Action 802, receiving reconfiguration information from a first node, e.g., according to Action 804, segmenting the resulting reconfiguration message if the size exceeds a limitation for lower layers, e.g., according to Action 808, and sending the reconfiguration message to a device, e.g., according to Action 809.

Certain embodiments disclosed herein may provide one or more of the following technical advantage(s), which may be summarized as follows. Embodiments herein may be understood to define MN and SN behavior to handle RRC messages that may exceed the PDCP limit for, e.g., LTE and NR. Embodiments herein may also provide methods to exchange information about support for segmentation between MN and SN to ensure a consistent segmentation solution in dual connectivity scenarios.

Figure 14:
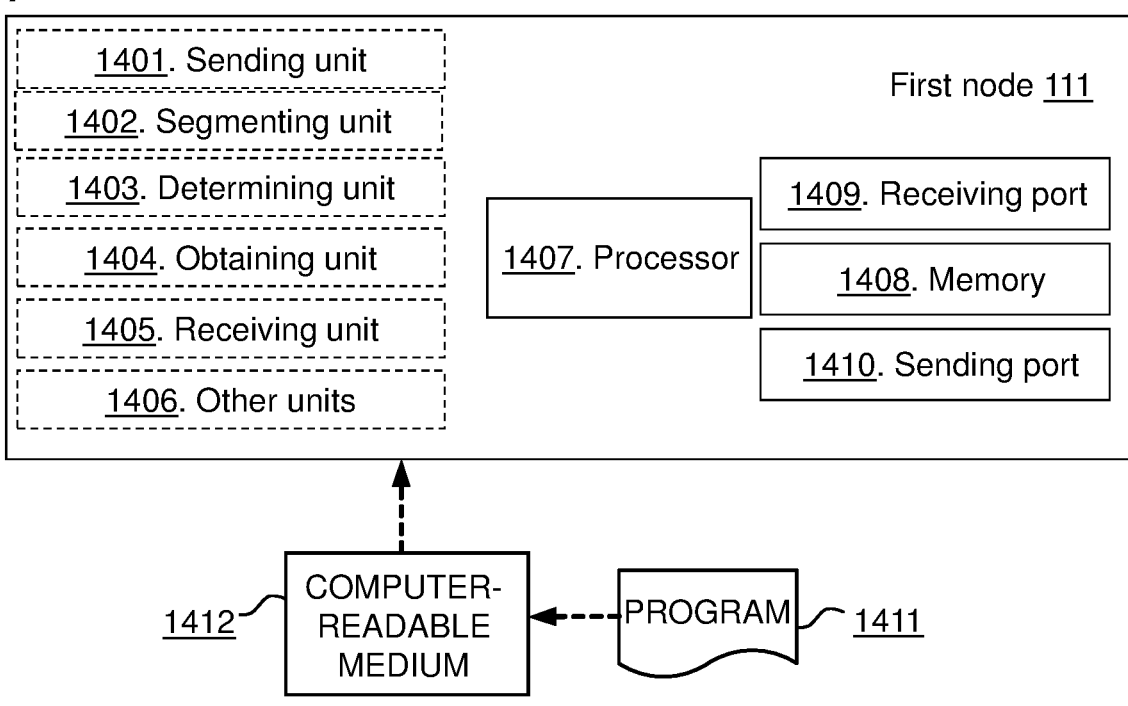
FIG. 14 is a schematic block diagram illustrating two non-limiting examples, a) and b), of a first node, according to embodiments herein.
Figure 14:
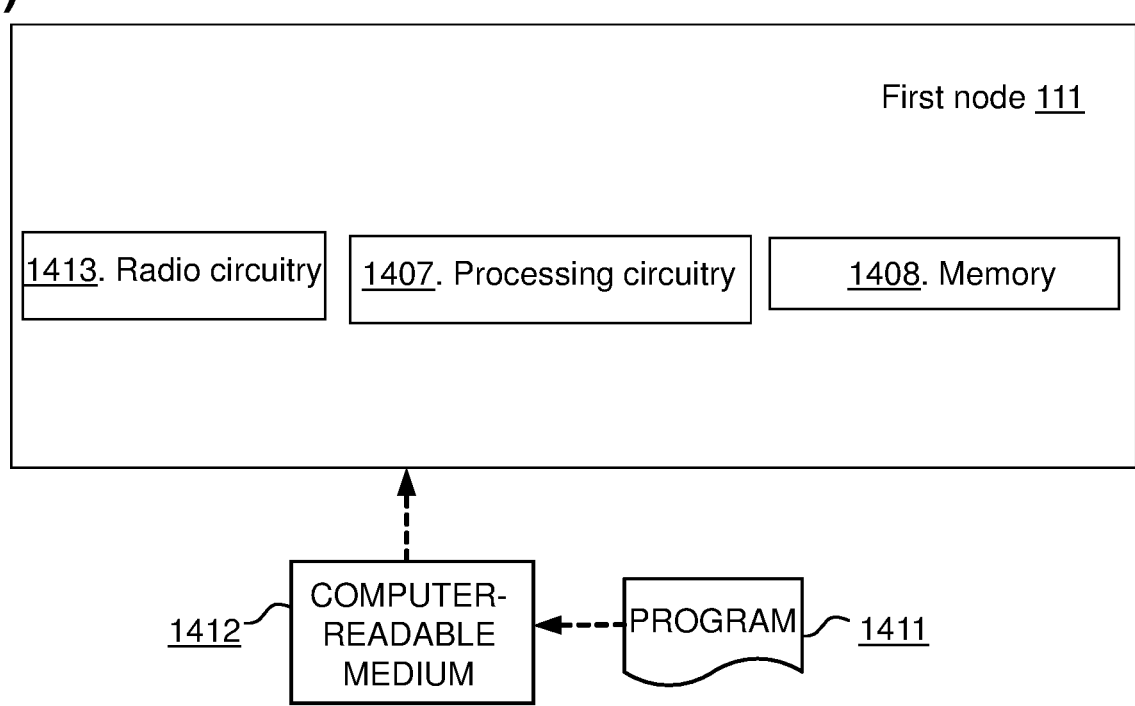

FIG. 14 depicts two different examples in panels a) and b), respectively, of the arrangement that the first node 111 may comprise. In some embodiments, the first node 111 may comprise the following arrangement depicted in FIG. 14a. The first node 111 may be understood to be for handling the message to the third node 113. The message is configured to comprise the content from at least the first second node 114 of the one or more second nodes 112. The first node 111 is configured to handle the radio communication with the third node 113 in coordination with the one or more second nodes 112. The first node 111 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and will thus not be repeated here. For example, in some embodiments at least one of the following may apply: i) the first node 111 may be configured to serve the third node 113 with multiple connectivity with the one or more second nodes 112, ii) the first node 111 may be to handover a connection with the third node 113 to or from the first second node 114, iii) the first node 111 may be configured to be a MN for the third node 113 and the one or more second nodes 114 may be configured to be SNs for the third node 113 in the multiple connectivity, iv) the first second node 114 may be configured to be a MN for the third node 113 and the first node 111 and the other one or more second nodes 121 may be configured to be SNs for the third node 113 in the multiple connectivity, v) the first node 111 may be configured to be the source node for the third node 113 and the first second node 114 may be configured to be the target node for the third node 113, vi) the first node 111 may be configured to be the target node for the third node 113 and the first second node 114 may be configured to be the source node for the third node 113, vii) the first node 111 may be configured to be a DU, and the first second node 114 may be configured to be a CU, viii) the first node 111 may be configured to be a CU and each of the one or more second nodes 112 may be configured to be a DU, and ix) the first node 111 may be configured to be a first DU and any of the one or more second nodes 112 may be configured to be another DU.

The message may be configured to be an RRC message

In FIG. 14, optional units are indicated with dashed boxes.

The first node 111 is configured to perform the sending of Action 809, e.g. by means of a sending unit 1401 within the first node 111, configured to, send the message to the third node 113. The message is configured to be one of segmented and not segmented. Whether the message is sent segmented or not segmented is configured to be based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 is configured to support segmentation of messages.

The first node 111 may be configured to perform the segmenting of Action 808, e.g. by means of a segmenting unit 1402, configured to segment at least one of: a) the first submessage from the first node 111 to be comprised in the message to the third node 113, b) at least one respective second submessage configured to be received from the one or more second nodes 112 and to be comprised in the message to the third node 113, and c) the combination of the first submessage and the at least one respective second submessage.

The message may be configured to be sent based on the first result of the segmentation.

The first node 111 may be configured to perform the determining of Action 807, e.g. by means of a determining unit 1403, configured to determine whether or not to segment the message based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 supports segmentation of messages. The message may be configured to be sent based on the second result of the determination.

In some embodiments, to determine whether or not to segment the message based on whether or not the size of the message exceeds the size limit may be configured to comprise further determining whether or not at least one of: a) the first submessage from the first node 111 to be comprised in the message to the third node 113 exceeds the first size limit, b) the one or more second submessages configured to be respectively received from the one or more second nodes 112 and to be comprised in the message to the third node 113 exceeds the respective second size limit, and c) the combination of the first submessage and the one or more second submessages exceeds the combined size limit. The message may be configured to be sent based on the third result of the further determination.

In some embodiments, the combination of the first submessage and the one or more second submessages may exceed the combined size limit, and the first node 111 may be further configured to segment the combination.

In some embodiments, the first node 111 may be further configured to at least one of the following.

The first node 111 may be configured to perform the obtaining of Action 801, e.g. by means of an obtaining unit 1404, configured to obtain the first indication configured to indicate whether or not the third node 113 supports or not segmentation of the message.

The first node 111 may be configured to perform the sending of Action 802, e.g. by means of the sending unit 1401, configured to send the one or more second indications to at least one of the one or more second nodes 112. The one or more second indications may be configured to indicate at least one of: i) whether or not the third node 113 supports segmentation of the message, ii) whether or not the first node 111 supports segmentation of the message, iii) the first version of the segmentation configured to be supported by the first node 111, and iv) the first size limit, the combined size limit, or both, configured to be supported by the first node 111 for segmenting the message.

The first node 111 may be configured to perform this receiving of Action 803, e.g. by means of a receiving unit 1405, configured to receive the one or more respective third indications from the one or more second nodes 112. The one or more respective third indications may be configured to respectively indicate at least one of: i) whether or not the one or more second nodes 112 support segmentation of the message, ii) the respective second version of the segmentation respectively supported by the one or more second nodes 112, and iii) the respective second size limit, the combined size limit, or both, respectively supported by the one or more second nodes 112 for segmenting the message.

The first node 111 may be configured to perform the receiving of Action 804, e.g. by means of the receiving unit 1405, configured to receive the third indication from the first second node 114. The third indication may be configured to respectively indicate at least one of: i) whether or not the first second node 114 supports segmentation of the message, ii) the second version of the segmentation supported by the first second node 114, and iii) the second size limit, the combined size limit, or both, supported by the first second node 114 for segmenting the message.

The first node 111 may be configured to perform the determining of Action 805, e.g. by means of the determining unit 1403, configured to determine at least one of: i) the respective second version of the segmentation supported by the one or more second nodes 112, ii) the respective second size limit, the combined size limit, or both, supported by the one or more second nodes 112 for segmenting the message, iii) the second version of the segmentation supported by the first second node 114, and iv) the second size limit, the combined size limit, or both, supported by the first second node 114 for segmenting the message.

In some embodiments wherein the first node 111 may be configured to send the second indication to at least the first second node 114 configured to indicate the first node 111 does not support segmentation, the first node 111 may be further configured to perform the receiving of Action 803, e.g. by means of the receiving unit 1405, configured to receive the second submessage from at least the first second node 114 to be comprised in the message to the third node 113. The second submessage may be configured to have the size under the first size limit which is configured to require no segmentation.

In some embodiments, wherein the first node 111 may be configured to serve the third node 113 with multiple connectivity with the one or more second nodes 112, at least one of the first node 111 and the first second node 114 may be configured to be an MN and the other may be configured to be an SN. Only the MN and the third node 113 may be configured to support segmentation.

In some embodiments, wherein the first node 111 may be configured to serve the third node 113 with multiple connectivity with the one or more second nodes 112, at least one of the first node 111 and the first second node 114 may be configured to be an MN and the other may be configured to be an SN. Both the MN, the SN and the third node 113 may be configured to support segmentation, and the sent message may be configured to be based on whether or not at least one of one or more second submessages from the one or more second nodes 112 to be comprised in the message to the third node 113 is segmented or not.

In some embodiments, wherein the first node 111 may be configured to be a SN, the first second node may be is configured to be an MN, and the segmenting may be configured to be performed according to a third size limit of the MN.

Other units 1406 may be comprised in the first node 111.

The embodiments herein in the first node 111 may be implemented through one or more processors, such as a processor 1407 in the first node 111 depicted in FIG. 14a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1408 comprising one or more memory units. The memory 1408 is arranged to be used to store obtained information, store data, configurations, schedulings, and applications etc. to perform the methods herein when being executed in the first node 111.

In some embodiments, the first node 111 may receive information from, e.g., the third node 113, the one or more second nodes 112, and/or the first second node 114, through a receiving port 1409. In some embodiments, the receiving port 1409 may be, for example, connected to one or more antennas in first node 111. In other embodiments, the first node 111 may receive information from another structure in the wireless communications network 100 through the receiving port 1409. Since the receiving port 1409 may be in communication with the processor 1407, the receiving port 1409 may then send the received information to the processor 1407. The receiving port 1409 may also be configured to receive other information.

The processor 1407 in the first node 111 may be further configured to transmit or send information to e.g., the third node 113, the one or more second nodes 112, the first second node 114, and/or another structure in the wireless communications network 100, through a sending port 1410, which may be in communication with the processor 1407, and the memory 1408.

Those skilled in the art will also appreciate that the units 1401-1406 described above may refer to a combination of analog and digital circuits, and/or one or more processors configured with software and/or firmware, e.g., stored in memory, that, when executed by the one or more processors such as the processor 1407, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1401-1406 described above may be implemented as one or more applications running on one or more processors such as the processor 1407.

Thus, the methods according to the embodiments described herein for the first node 111 may be respectively implemented by means of a computer program 1411 product, comprising instructions, i.e., software code portions, which, when executed on at least one processor 1407, cause the at least one processor 1407 to carry out the actions described herein, as performed by the first node 111. The computer program 1411 product may be stored on a computer-readable storage medium 1412. The computer-readable storage medium 1412, having stored thereon the computer program 1411, may comprise instructions which, when executed on at least one processor 1407, cause the at least one processor 1407 to carry out the actions described herein, as performed by the first node 111. In some embodiments, the computer-readable storage medium 1412 may be a non-transitory computer-readable storage medium, such as a CD ROM disc, or a memory stick. In other embodiments, the computer program 1411 product may be stored on a carrier containing the computer program 1411 just described, wherein the carrier is one of an electronic signal, optical signal, radio signal, or the computer-readable storage medium 1412, as described above.

The first node 111 may comprise a communication interface configured to facilitate communications between the first node 111 and other nodes or devices, e.g., the third node 113, the one or more second nodes 112, the first second node 114, and/or another structure in the wireless communications network 100. The interface may, for example, include a transceiver configured to transmit and receive radio signals over an air interface in accordance with a suitable standard.

In other embodiments, the first node 111 may comprise the following arrangement depicted in FIG. 14b. The first node 111 may comprise a processing circuitry 1407, e.g., one or more processors such as the processor 1407, in the first node 111 and the memory 1408. The first node 111 may also comprise a radio circuitry 1413, which may comprise e.g., the receiving port 1409 and the sending port 1410. The processing circuitry 1407 may be configured to, or operable to, perform the method actions according to FIG. 8, FIGS. 10-13 and/or FIGS. 17-21, in a similar manner as that described in relation to FIG. 14a. The radio circuitry 1413 may be configured to set up and maintain at least a wireless connection with the third node 113, the one or more second nodes 112, the first second node 114, and/or another structure in the wireless communications network 100. Circuitry may be understood herein as a hardware component.

Hence, embodiments herein also relate to the first node 111 operative to operate in the wireless communications network 100. The first node 111 may comprise the processing circuitry 1407 and the memory 1408, said memory 1408 containing instructions executable by said processing circuitry 1407, whereby the first node 111 is further operative to perform the actions described herein in relation to the first node 111, e.g., in FIG. 8, FIGS. 10-13 and/or FIGS. 17-21.

Figure 15:
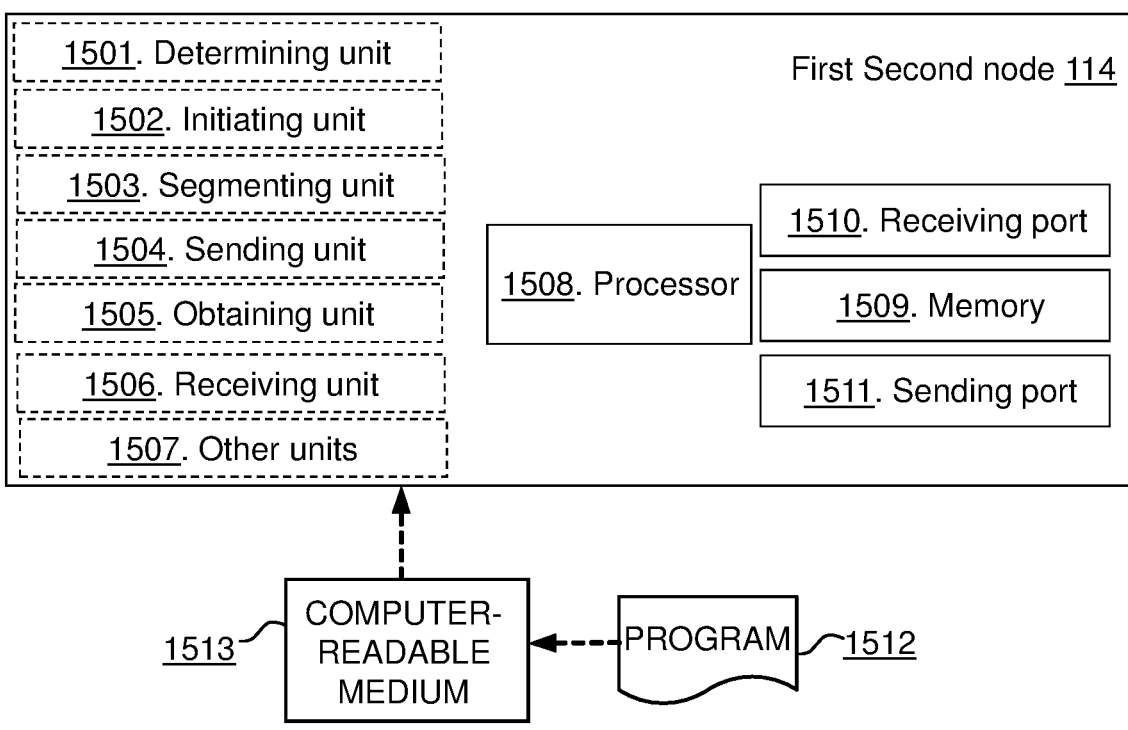
FIG. 15 is a schematic block diagram illustrating two non-limiting examples, a) and b), of a first second node, according to embodiments herein.
Figure 15:
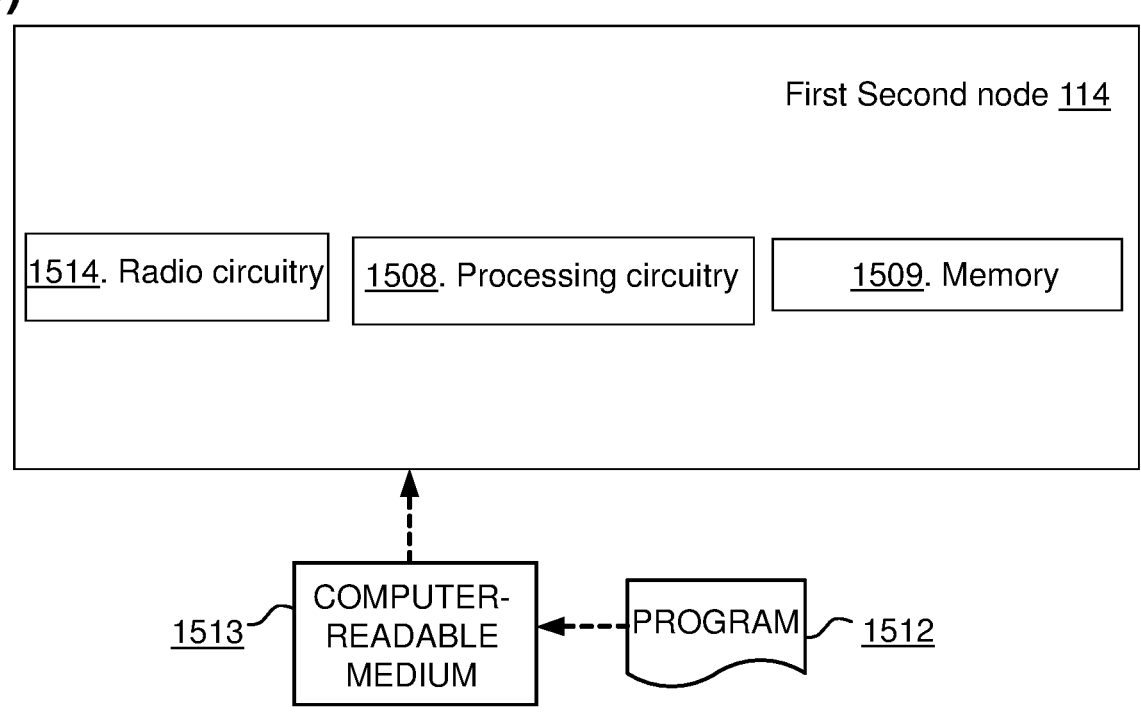

FIG. 15 depicts two different examples in panels a) and b), respectively, of the arrangement that the first second node 114 may comprise. In some embodiments, the first second node 114 may comprise the following arrangement depicted in FIG. 15*a*. The first second node 114 may be understood to be for handling the message to the third node 113. The message is configured to comprise the content from at least the first second node 114 of the one or more second nodes 112. The first second node 114 is configured to handle the radio communication with the third node 113 in coordination with at least the first node 111. The first second node 114 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 111 and the first second node 114 and will thus not be repeated here. For example, in some embodiments at least one of the following may apply: i) the first second node 114 may be configured to serve the third node 113 with multiple connectivity with the first node 111, the one or more second nodes 112, or both, ii) the first second node 114 may be to handover the connection with the third node 113 to or from the first node 111, iii) the first node 111 may be configured to be a MN for the third node 113 and the one or more second nodes 114 may be configured to be SNs for the third node 113 in the multiple connectivity, iv) the first second node 114 may be configured to be a MN for the third node 113 and the first node 111 and the other one or more second nodes 121 may be configured to be SNs for the third node 113 in the multiple connectivity, v) the first node 111 may be configured to be the source node for the third node 113 and the first second node 114 may be configured to be the target node for the third node 113, vi) the first node 111 may be configured to be the target node for the third node 113 and the first second node 114 may be configured to be the source node for the third node 113, vii) the first node 111 may be configured to be a DU, and the first second node 114 may be configured to be a CU, viii) the first node 111 may be configured to be a CU and each of the one or more second nodes 112 may be configured to be a DU, and ix) the first node 111 may be configured to be a first DU and any of the one or more second nodes 112 may be configured to be another DU.

The message may be configured to be an RRC message.

In FIG. 15, optional units are indicated with dashed boxes.

The first second node 114 may be configured to perform the determining of Action 907, e.g. by means of a determining unit 1501, configured to determine whether or not to segment the message based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 supports segmentation of messages.

The first second node 114 may be configured to perform the initiating processing of Action 907, e.g. by means of an initiating unit 1502 within the first second node 114, configured to initiate processing the message based on the fourth result of the determination.

In some embodiments, to initiate processing the message may be configured to comprise that the first second node 114 may be configured to perform the segmenting of Action 908, e.g. by means of a segmenting unit 1503, configured to segment at least one of: a) the first submessage from the first second node 114 to be comprised in the message to the third node 113, b) the first submessage from the first node 111 to be comprised in the message to the third node 113, c) at least one respective second submessage received from the one or more second nodes 112 and to be comprised in the message to the third node 113, and d) the combination of the first submessage and the at least one of the second submessage and the at least one respective second submessages.

The segmenting may be configured to be based on the fourth result of the determination.

In some embodiments, to initiate processing the message may be configured to comprise that the first second node 114 may be configured to perform the sending of Action 910, e.g. by means of a sending unit 1504 within the first second node 114, configured to, send the message to the third node 113. The message may be configured to be one of segmented and not segmented. Whether the message is sent segmented or not segmented may be configured to be based on: i) whether or not the size of the message exceeds the size limit, ii) whether or not the third node 113 supports segmentation of messages, iii) whether or not the first node 111 supports segmentation of messages, and iv) whether or not at least the first second node 114 of the one or more second nodes 112 is configured to support segmentation of messages.

In some embodiments, to determine whether or not to segment the message based on whether or not the size of the message exceeds the size limit may be configured to comprise further determining whether or not at least one of: a) the first submessage from the first node 111 to be comprised in the message to the third node 113 exceeds the first size limit, b) the second submessage from the first second node 114 to be comprised in the message to the third node 113 exceeds the second size limit, c) the one or more respective second submessages respectively configured to be received from the one or more second nodes 112 and to be comprised in the message to the third node 113 exceed the respective second size limit, and d) the combination of the first submessage and the second submessage and/or the one or more respective second submessages exceeds the combined size limit. The message may be configured to be sent based on the fifth result of the further determination.

In some embodiments, the combination exceeds the combined size limit, and the first second node 114 may be further configured to segment the combination.

In some embodiments, the first second node 114 may be further configured to at least one of the following.

The first second node 114 may be configured to perform the obtaining of Action 901, e.g. by means of an obtaining unit 1505, configured to obtain the first indication configured to indicate whether or not the third node 113 supports or not segmentation of the message.

The first second node 114 may be configured to perform the receiving of Action 902, e.g. by means of a receiving unit 1506, configured to receive the one or more second indications from the first node 111. The one or more second indications may be configured to indicate at least one of: i) whether or not the third node 113 supports segmentation of the message, ii) whether or not the first node 111 supports segmentation of the message, iii) the first version of the segmentation configured to be supported by the first node 111, and iv) the first size limit, the combined size limit, or both, configured to be supported by the first node 111 for segmenting the message.

The first second node 114 may be configured to perform the receiving of Action 903, e.g. by means of the receiving unit 1506, configured to receive the one or more respective third indications from the one or more second nodes 112. The one or more respective third indications may be configured to respectively indicate at least one of: i) whether or not the one or more second nodes 112 support segmentation of the message, ii) the respective second version of the segmentation respectively supported by the one or more second nodes 112, and iii) the respective second size limit, the combined size limit, or both, respectively supported by the one or more second nodes 112 for segmenting the message.

The first second node 114 may be configured to perform this sending of Action 904, e.g. by means of the receiving unit 1504, configured to send the third indication to at least one of the first node 111 and the other nodes of the one or more second nodes 112. The third indication may be configured to respectively indicate at least one of: i) whether or not the first second node 114 supports segmentation of the message, ii) the second version of the segmentation supported by the first second node 114, and iii) the second size limit, the combined size limit, or both, supported by the first second node 114 for segmenting the message.

The first second node 114 may be configured to perform the determining of Action 905, e.g. by means of the determining unit 1501, configured to determine at least one of: i) the respective second version of the segmentation supported by the one or more second nodes 112, ii) the respective second size limit, the combined size limit, or both, supported by the one or more second nodes 112 for segmenting the message, iii) the second version of the segmentation supported by the first node 111, and iv) the first size limit, the combined size limit, or both, configured to be supported by the first node 111 for segmenting the message.

In some embodiments wherein the first second node 114 may be configured to receive the second indication configured to indicate the first node 111 does not support segmentation, to initiate processing the message may be configured to comprise that the first second node 114 may be further configured to perform the sending of Action 909, e.g. by means of the sending unit 1504, configured to send the second submessage to the first node 111, to be comprised in the message to the third node 113. The second submessage has a size under the first size limit which is configured to require no segmentation.

In some embodiments, wherein the first second node 114 may be configured to serve the third node 113 with multiple connectivity with the one or more second nodes 112 and the first node 111, at least one of the first node 111 and the first second node 114 may be configured to be an MN and the other may be configured to be an SN. Only the MN and the third node 113 may be configured to support segmentation.

In some embodiments, wherein the first second node 114 may be configured to serve the third node 113 with multiple connectivity with the one or more second nodes 112 and the first node 111, at least one of the first node 111 and the first second node 114 may be configured to be an MN and the other may be configured to be an SN. Both the MN, the SN and the third node 113 may be configured to support segmentation, and the determining may be based on whether or not at least one of one or more respective second submessages from the one or more second nodes 112 to be comprised in the message to the third node 113 is segmented or not.

In some embodiments, wherein the first node 111 may be configured to be a SN, the first second node may be is configured to be an MN, and the segmenting may be configured to be performed according to the third size limit of the MN.

Other units 1507 may be comprised in the first second node 114.

The embodiments herein in the first second node 114 may be implemented through one or more processors, such as a processor 1508 in the first second node 114 depicted in FIG. 15*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first second node 114. One such carrier may be in the form of a CD ROM disc. It is however feasible with other data carriers such as a memory stick. The computer program code may furthermore be provided as pure program code on a server and downloaded to the first second node 114.

The first second node 114 may further comprise a memory 1509 comprising one or more memory units. The memory 1509 is arranged to be used to store obtained information, store data, configurations, schedulings, and applications etc. to perform the methods herein when being executed in the first second node 114.

In some embodiments, the first second node 114 may receive information from, e.g., the third node 113, the other one or more second nodes 112 and/or the first node 111, through a receiving port 1510. In some embodiments, the receiving port 1510 may be, for example, connected to one or more antennas in first second node 114. In other embodiments, the first second node 114 may receive information from another structure in the wireless communications network 100 through the receiving port 1510. Since the receiving port 1510 may be in communication with the processor 1508, the receiving port 1510 may then send the received information to the processor 1508. The receiving port 1510 may also be configured to receive other information.

The processor 1508 in the first second node 114 may be further configured to transmit or send information to e.g., the third node 113, the other one or more second nodes 112, the first node 111, and/or another structure in the wireless communications network 100, through a sending port 1511, which may be in communication with the processor 1508, and the memory 1509.

Those skilled in the art will also appreciate that the units 1501-1507 described above may refer to a combination of analog and digital circuits, and/or one or more processors configured with software and/or firmware, e.g., stored in memory, that, when executed by the one or more processors such as the processor 1508, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1501-1507 described above may be implemented as one or more applications running on one or more processors such as the processor 1508.

Thus, the methods according to the embodiments described herein for the first second node 114 may be respectively implemented by means of a computer program 1512 product, comprising instructions, i.e., software code portions, which, when executed on at least one processor 1508, cause the at least one processor 1508 to carry out the actions described herein, as performed by the first second node 114. The computer program 1512 product may be stored on a computer-readable storage medium 1513. The computer-readable storage medium 1513, having stored thereon the computer program 1512, may comprise instructions which, when executed on at least one processor 1508, cause the at least one processor 1508 to carry out the actions described herein, as performed by the first second node 114. In some embodiments, the computer-readable storage medium 1513 may be a non-transitory computer-readable storage medium, such as a CD ROM disc, or a memory stick. In other embodiments, the computer program 1512 product may be stored on a carrier containing the computer program 1512 just described, wherein the carrier is one of an electronic signal, optical signal, radio signal, or the computer-readable storage medium 1513, as described above.

The first second node 114 may comprise a communication interface configured to facilitate communications between the first second node 114 and other nodes or devices, e.g., the third node 113, the other one or more second nodes 112, the first node 111, and/or another structure in the wireless communications network 100. The interface may, for example, include a transceiver configured to transmit and receive radio signals over an air interface in accordance with a suitable standard.

In other embodiments, the first second node 114 may comprise the following arrangement depicted in FIG. 15*b*. The first second node 114 may comprise a processing circuitry 1508, e.g., one or more processors such as the processor 1508, in the first second node 114 and the memory 1509. The first second node 114 may also comprise a radio circuitry 1514, which may comprise e.g., the receiving port 1510 and the sending port 1511. The processing circuitry 1508 may be configured to, or operable to, perform the method actions according to FIG. 9, FIGS. 10-13 and/or FIGS. 17-21, in a similar manner as that described in relation to FIG. 15*a*. The radio circuitry 1514 may be configured to set up and maintain at least a wireless connection with the third node 113, the other one or more second nodes 112, the first node 111, and/or another structure in the wireless communications network 100. Circuitry may be understood herein as a hardware component.

Hence, embodiments herein also relate to the first second node 114 operative to operate in the wireless communications network 100. The first second node 114 may comprise the processing circuitry 1508 and the memory 1509, said memory 1509 containing instructions executable by said processing circuitry 1508, whereby the first second node 114 is further operative to perform the actions described herein in relation to the first second node 114, e.g., in FIG. 9, FIGS. 10-13 and/or FIGS. 17-21.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Further Extensions and Variations

Figure 16:
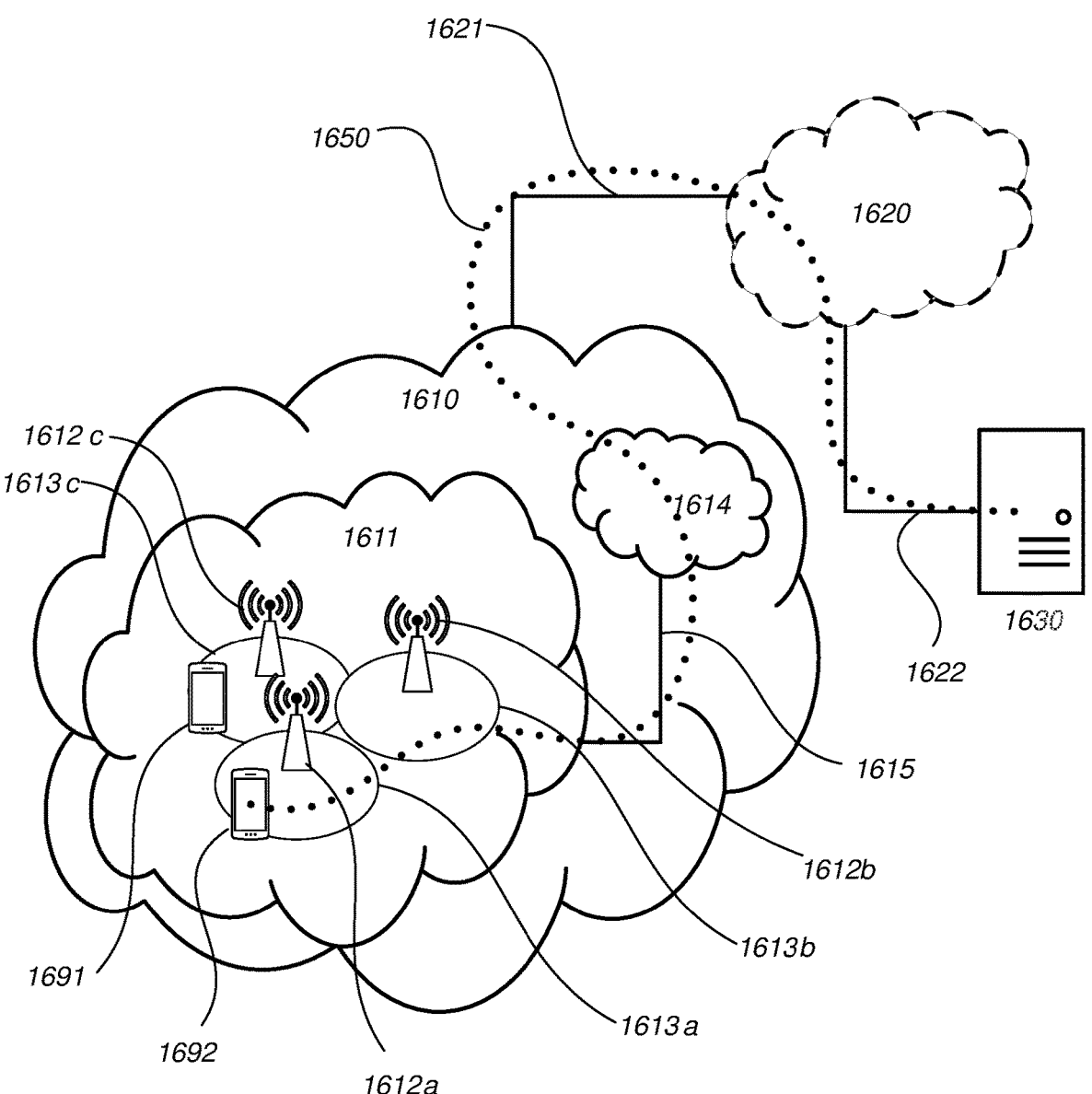
FIG. 16 is a schematic block diagram illustrating a telecommunication network connected via an intermediate network to a host computer, according to embodiments herein.

FIG. 16: Telecommunication network connected via an intermediate network to a host computer in accordance with some embodiments With reference to FIG. 16, in accordance with an embodiment, a communication system includes telecommunication network 1610 such as the wireless communications network 100, for example, a 3GPP-type cellular network, which comprises access network 1611, such as a radio access network, and core network 1614. Access network 1611 comprises a plurality of network nodes such as any or both of the first node 111 and the one or more second nodes 112, e.g., the first second node 114. For example, base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to core network 1614 over a wired or wireless connection 1615. A plurality of wireless devices, such as the wireless device 130, are comprised in the wireless communications network 100. In FIG. 16, a first UE 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612. Any of the UEs 1691, 1692 are examples of the wireless device 130.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

In relation to FIGS. 17, 18, 19, 20, and 21, which are described next, it may be understood that a UE is an example of the wireless device 130, and that any description provided for the UE equally applies to the wireless device 130. It may be also understood that the base station is an example of any or both of the first node 111 and the one or more second nodes 112, e.g., the first second node 114, and that any description provided for the base station equally applies to any or both of the first node 111 and the one or more second nodes 112, e.g., the first second node 114.

Figure 17:
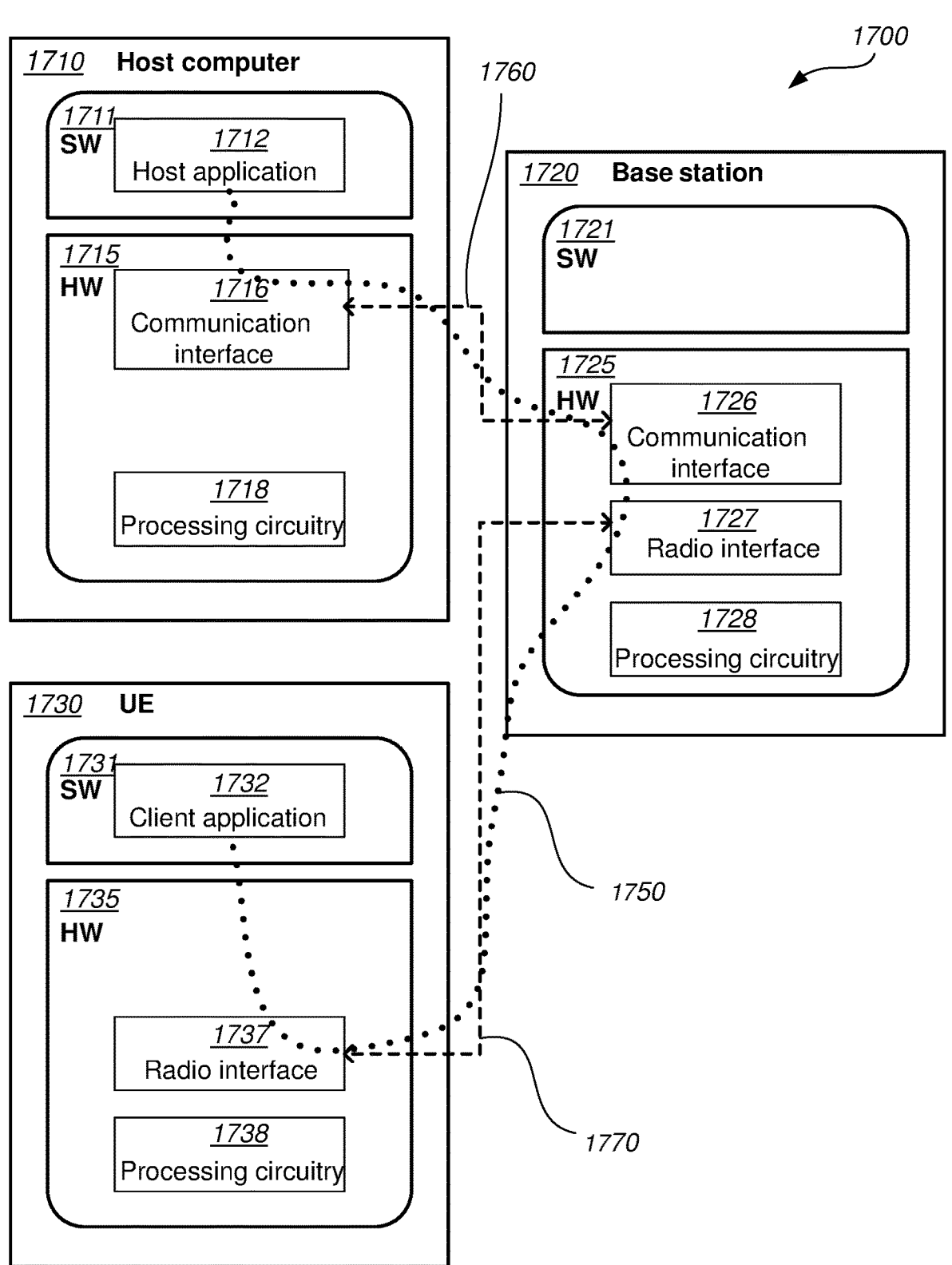
FIG. 17 is a generalized block diagram of a host computer communicating via a base station with a user equipment over a partially wireless connection, according to embodiments herein.

FIG. 17: Host computer communicating via a base station with a user equipment over a partially wireless connection in accordance with some embodiments Example implementations, in accordance with an embodiment, of the wireless device 130, e.g., a UE, the first node 111, e.g., a base station and host computer discussed in the preceding paragraphs will now be described with reference to FIG. 17. In communication system 1700, such as the wireless communications network 100, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes the first node 111, exemplified in FIG. 17 as a base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with the wireless device 130, exemplified in FIG. 17 as a UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612a, 1612b, 1612c and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

The first node embodiments relate to FIG. 8, FIGS. 10-13, FIG. 14 and FIGS. 17-21.

The first node 111 may also be configured to communicate user data with a host application unit in a host computer 1710, e.g., via another link such as 1750.

The first node 111 may comprise an arrangement as shown in FIG. 14 or in FIG. 17.

The first second node embodiments relate to FIG. 9, FIGS. 10-13, FIG. 15 and FIGS. 17-21.

The first second node 114 may also be configured to communicate user data with a host application unit in a host computer 1710, e.g., via another link such as 1750.

The first second node 114 may comprise an arrangement as shown in FIG. 15 or in FIG. 17.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

FIG. 20: Methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

FIG. 21: Methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the first node 111 or the first second node 114.

5. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform one or more of the actions described herein as performed by the first node 111 or the first second node 114.

6. The communication system of embodiment 5, further including the base station.

7. The communication system of embodiment 6, further including the UE, wherein the UE is configured to communicate with the base station.

8. The communication system of embodiment 7, wherein:
    the processing circuitry of the host computer is configured to execute a host application, thereby providing the user data; and
    the UE comprises processing circuitry configured to execute a client application associated with the host application.

11. A method implemented in a base station, comprising one or more of the actions described herein as performed by the first node 111 or the first second node 114.

15. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs one or more of the actions described herein as performed by the first node 111 or the first second node 114.

16. The method of embodiment 15, further comprising:
    at the base station, transmitting the user data.

17. The method of embodiment 16, wherein the user data is provided at the host computer by executing a host application, the method further comprising:
    at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:
    the processing circuitry of the host computer is configured to execute a host application, thereby providing the user data; and
    the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs one or more of the actions described herein as performed by the wireless device 130.

36. The method of embodiment 35, further comprising:
    at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
    a communication interface configured to receive user data originating from a transmission from a user equipment (UE) to a base station,
    wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the first node 111 or the first second node 114.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the first node 111 or the first second node 114.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the first node 111 or the first second node 114.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 130.

76. The method of embodiment 75, further comprising:
at the base station, receiving the user data from the UE.

77. The method of embodiment 76, further comprising:
at the base station, initiating a transmission of the received user data to the host computer.

REFERENCES

1. R2-2000009, (ftp://ftp.3gpp.org/tsg_ran/WG2_RL2/TSGR2_108/Report/R2-2000009.zip)
2. 3GPP TS 37.340 v16.1.0, (http://www.3gpp.org/ftp//Specs/archive/37_series/37.340/37340-g10.zip)
3. 3GPP TR 37.873 v16.0.0, (http://www.3gpp.org/ftp//Specs/archive/37_series/37.873/37873-g00.zip)
4. R2-1915763, CR to 38.331, "Introduction of RRC Segmentation—Downlink", (ftp://ftp.3gpp.org/tsg_ran/WG2_RL2/TSGR2_108/Docs/R2-1915763.zip)

The invention claimed is:

1. A method performed by a first node, the method being for handling a message to a third node, the message comprising content from at least a first second node of one or more second nodes, wherein the first node handles a radio communication with the third node in coordination with the one or more second nodes, the first node operating in the wireless communications network, the method comprising:
sending the message to the third node, wherein the message is one of segmented and not segmented, and wherein whether the message is sent segmented or not segmented is based on:
i. whether or not a size of the message exceeds a size limit,
ii. whether or not the third node supports segmentation of messages,
iii. whether or not the first node supports segmentation of messages, and
iv. determining, based on an indication received from the first second node, whether or not at least the first second node of the one or more second nodes supports segmentation of messages.

2. The method according to claim 1, wherein at least one of:
i. the first node serves the third node with multiple connectivity with the one or more second nodes,
ii. the first node is to handover a connection with the third node to or from the first second node,
iii. the first node is a Master Node, MN, for the third node and the one or more second nodes are Secondary Nodes, SNs, for the third node in the multiple connectivity, iv. the first second node is a Master Node, MN, for the third node and the first node and the other one or more second nodes are Secondary Nodes, SNs, for the third node in the multiple connectivity, v. the first node is a source node for the third node and the first second node is a target node for the third node, vi. the first node is a target node for the third node and the first second node is a source node for the third node, vii. the first node is a Distributed Unit, DU, and the first second node is a Centralized Unit, CU, viii. the first node is a CU and each of the one or more second nodes is a DU, and ix. the first node is a first DU and any of the one or more second nodes is another DU.

3. The method according to claim 1, further comprising: segmenting at least one of: a) a first submessage from the first node to be comprised in the message to the third node, b) at least one respective second submessage received from the one or more second nodes and to be comprised in the message to the third node, and c) a combination of the first submessage and the at least one respective second submessage, and wherein the message is sent based on a first result of the segmentation.

4. The method according to claim 1, further comprising: determining whether or not to segment the message based on:

i. whether or not the size of the message exceeds the size limit, ii. whether or not the third node supports segmentation of messages, iii. whether or not the first node supports segmentation of messages, and iv. whether or not at least the first second node of the one or more second nodes supports segmentation of messages, and wherein the message is sent based on a second result of the determination.

5. The method according to claim 4, wherein determining whether or not to segment the message based on whether or not the size of the message exceeds the size limit comprises further determining whether or not at least one of:

a first submessage from the first node to be comprised in the message to the third node exceeds a first size limit, one or more second submessages respectively received from the one or more second nodes and to be comprised in the message to the third node exceeds a respective second size limit, and a combination of the first submessage and the one or more second submessages exceeds a combined size limit, and wherein the message is sent based on a third result of the further determination.

6. The method according to claim 3, wherein the combination of the first submessage and the one or more second submessages exceeds the combined size limit, and wherein the method further comprises segmenting the combination.

7. The method according to claim 1, wherein the method further comprises at least one of:

obtaining a first indication indicating whether or not the third node supports or not segmentation of the message, sending one or more second indications to at least one of the one or more second nodes, the one or more second indications indicating at least one of:

i. whether or not the third node supports segmentation of the message, ii. whether or not the first node supports segmentation of the message, iii. a first version of the segmentation supported by the first node, and iv. a first size limit, a combined size limit, or both, supported by the first node for segmenting the message, receiving one or more respective third indications from the one or more second nodes, the one or more respective third indications respectively indicating at least one of:

i. whether or not the one or more second nodes support segmentation of the message, ii. a respective second version of the segmentation respectively supported by the one or more second nodes, and iii. a respective second size limit, a combined size limit, or both, respectively supported by the one or more second nodes for segmenting the message, receiving a third indication from the first second node, the third indication respectively indicating at least one of:

i. whether or not the first second node supports segmentation of the message, ii. a second version of the segmentation supported by the first second node, and iii. a second size limit, a combined size limit, or both, supported by the first second node for segmenting the message, determining at least one of:

i. the respective second version of the segmentation supported by the one or more second nodes, ii. the respective second size limit, the combined size limit, or both, supported by the one or more second nodes for segmenting the message, iii. the second version of the segmentation supported by the first second node, and iv. the second size limit, the combined size limit, or both, supported by the first second node for segmenting the message.

8. The method according to claim 7, wherein the first node sends a second indication to at least the first second node indicating the first node does not support segmentation and wherein method further comprises:

receiving a second submessage from at least the first second node to be comprised in the message to the third node, wherein the second submessage has a size under the first size limit which requires no segmentation.

9. The method according to claim 1, wherein the first node serves the third node with multiple connectivity with the one or more second nodes, wherein at least one of the first node and the first second node is an MN and the other is an SN, and wherein only the MN and the third node support segmentation.

10. The method according to claim 1, wherein the first node serves the third node with multiple connectivity with the one or more second nodes, wherein at least one of the first node and the first second node is an MN and the other is an SN, wherein both the MN, the SN and the third node support segmentation, and wherein the sent message is based on whether or not at least one of one or more second submessages from the one or more second nodes to be comprised in the message to the third node is segmented or not.

11. The method according to claim 3, wherein the first node is a SN, wherein the first second node is an MN, and wherein the segmenting is performed according to a third size limit of the MN.

12. The method according to claim 1, wherein the message is a Radio Resource Control, RRC, message.

13. A method performed by a first second node, the method being for handling a message to a third node, the message comprising content from at least the first second node of one or more second nodes, wherein the first second node handles a radio communication with the third node in coordination with at least a first node, the first second node operating in the wireless communications network, the method comprising:

determining whether or not to segment the message based on:
i. whether or not the size of the message exceeds a size limit,
ii. whether or not the third node supports segmentation of messages,
iii. determining, based on an indication received from the first node, whether or not the first node supports segmentation of messages, and
iv. whether or not at least the first second node of the one or more second nodes supports segmentation of messages, and
initiating processing the message based on a fourth result of the determination.

14. The method according to claim 13, wherein at least one of:
i. the first second node serves the third node with multiple connectivity with the first node, the one or more second nodes or both,
ii. the first second node is to handover a connection with the third node to or from the first node,
iii. the first node is a Master Node, MN, for the third node and the one or more second nodes are Secondary Nodes, SNs, for the third node in the multiple connectivity,
iv. the first second node is a Master Node, MN, for the third node and the first node and the other one or more second nodes are Secondary Nodes, SNs, for the third node in the multiple connectivity,
v. the first node is a source node for the third node and the first second node is a target node for the third node,
vi. the first node is a target node for the third node and the first second node is a source node for the third node,
vii. the first node is a Distributed Unit, DU, and the first second node is a Centralized Unit, CU,
viii. the first node is a CU and each of the one or more second nodes is a DU and
ix. the first node is a first DU and any of the one or more second nodes is another DU.

15. The method according to claim 13, wherein the initiating processing the message comprises:
segmenting at least one of: a) a second submessage from the first second node to be comprised in the message to the third node, b) a first submessage from the first node to be comprised in the message to the third node, c) at least one respective second submessage received from the one or more second nodes and to be comprised in the message to the third node, and d) a combination of the first submessage and the at least one of the second submessage and the at least one respective second submessage, and
wherein the segmenting is based on a fourth result of the determination.

16. The method according to claim 13, wherein the initiating processing the message comprises:
sending the message to the third node, wherein the message is one of segmented and not segmented, and wherein whether the message is sent segmented or not segmented is based on:

i. whether or not a size of the message exceeds the size limit,
ii. whether or not the third node supports segmentation of messages,
iii. whether or not the first node supports segmentation of messages, and
iv. whether or not at least the first second node of the one or more second nodes supports segmentation of messages.

17. The method according to claim 13, wherein determining whether or not to segment the message based on whether or not the size of the message exceeds the size limit comprises further determining whether or not at least one of:
a first submessage from the first node to be comprised in the message to the third node exceeds a first size limit,
a second submessage from the first second node to be comprised in the message to the third node exceeds a second size limit,
one or more respective second submessages respectively received from the one or more second nodes and to be comprised in the message to the third node exceed a respective second size limit, and
a combination of the first submessage and the second submessage and/or the one or more respective second submessages exceeds a combined size limit, and
wherein the message is sent based on a fifth result of the further determination.

18. The method according to claim 15, wherein the combination exceeds the combined size limit, and wherein the method further comprises segmenting the combination.

19. The method according to claim 13, wherein the method further comprises at least one of:
obtaining a first indication indicating whether or not the third node supports segmentation of the message,
receiving one or more second indications from the first node, the one or more second indications indicating at least one of:
i. whether or not the third node supports segmentation of the message,
ii. whether or not the first node supports segmentation of the message,
iii. a first version of the segmentation supported by the first node, and
iv. a first size limit, a combined size limit, or both, supported by the first node for segmenting the message,
receiving one or more respective third indications from the one or more second nodes, the one or more respective third indications respectively indicating at least one of:
i. whether or not the one or more second nodes support segmentation of the message,
ii. a respective second version of the segmentation respectively supported by the one or more second nodes, and
iii. a respective second size limit, a combined size limit, or both, respectively supported by the one or more second nodes for segmenting the message,
sending a third indication to at least one of the first node and the other nodes of the one or more second nodes, the third indication respectively indicating at least one of:
i. whether or not the first second node supports segmentation of the message,
ii. a second version of the segmentation supported by the first second node, and iii. a second size limit, a combined size limit, or both, supported by the first second node for segmenting the message, determining at least one of:

i. the respective second version of the segmentation respectively supported by the one or more second nodes, ii. the respective second size limit, the combined size limit, or both, supported by the one or more second nodes for segmenting the message, iii. the first version of the segmentation supported by the first node, iv. the first size limit, the combined size limit, or both, supported by the first node for segmenting the message.

20. The method according to claim 19, wherein the first second node receives the second indication indicating the first node does not support segmentation and wherein the initiating processing the message comprises:

sending a second submessage to the first node, to be comprised in the message to the third node, wherein the second submessage has a size under the first size limit which requires no segmentation.

21. The method according to claim 13, wherein the first second node serves the third node with multiple connectivity with the one or more second nodes and the first node, wherein at least one of the first node and the first second node is an MN and the other is an SN, and wherein only the MN and the third node support segmentation.

22. The method according to claim 13, wherein the first second node serves the third node with multiple connectivity with the one or more second nodes and the first node, wherein at least one of the first node and the first second node is an MN and the other is an SN, wherein both the MN, the SN and the third node support segmentation, and wherein the determining is based on whether or not at least one of one or more respective second submessages from the one or more second nodes to be comprised in the message to the third node is segmented or not.

23. The method according to claim 15, wherein the first node is a SN, wherein the first second node is an MN, and wherein the segmenting is performed according to a third size limit of the MN.

24. The method according to claim 13, wherein the message is a Radio Resource Control, RRC, message.

25. A first node, for handling a message to a third node, the message being configured to comprise content from at least a first second node of one or more second nodes, wherein the first node is configured to handle a radio communication with the third node in coordination with the one or more second nodes, the first node being configured to operate in the wireless communications network, the first node being further configured to:

send the message to the third node, wherein the message is configured to be one of segmented and not segmented, and wherein whether the message is sent segmented or not segmented is configured to be based on:

i. whether or not a size of the message exceeds a size limit, ii. whether or not the third node supports segmentation of messages, iii. whether or not the first node supports segmentation of messages, and iv. determining, based on an indication received from the first second node, whether or not at least the first second node of the one or more second nodes is configured to support segmentation of messages.

26. The first node according to claim 25, being further configured to:

segment at least one of: a) a first submessage from the first node to be comprised in the message to the third node, b) at least one respective second submessage configured to be received from the one or more second nodes and to be comprised in the message to the third node, and c) a combination of the first submessage and the at least one respective second submessage, and wherein the message is configured to be sent based on a first result of the segmentation.

\* \* \* \* \*